(12) United States Patent
Agarwal et al.

(10) Patent No.: US 8,818,393 B2
(45) Date of Patent: Aug. 26, 2014

(54) TRANSITION MECHANISM FOR ENERGY EFFICIENT MOBILE OVERLAY NETWORK

(71) Applicant: Fujitsu Limited, Kawasaki (JP)

(72) Inventors: Rajni Agarwal, Northwood (GB); Kevin Power, West Drayton Middlesex (GB)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/711,845

(22) Filed: Dec. 12, 2012

(65) Prior Publication Data

US 2013/0122913 A1   May 16, 2013

Related U.S. Application Data

(63) Continuation of application No. PCT/EP2010/059319, filed on Jun. 30, 2010.

(51) Int. Cl.
*H04W 72/00* (2009.01)
*H04W 72/04* (2009.01)
*H04W 24/02* (2009.01)
*H04W 36/16* (2009.01)
*H04W 16/32* (2009.01)

(52) U.S. Cl.
CPC .............. *H04W 72/04* (2013.01); *H04W 16/32* (2013.01); *H04W 24/02* (2013.01); *H04W 72/0473* (2013.01); *H04W 36/16* (2013.01); *Y02B 60/50* (2013.01)
USPC ........... 455/453; 455/439; 455/440; 455/441; 455/442; 455/443; 455/450; 455/451; 455/452.1; 455/452.2

(58) Field of Classification Search
USPC ................... 455/439–443, 450–453
See application file for complete search history.

(56) References Cited

U.S. PATENT DOCUMENTS

| 5,890,067 | A | * | 3/1999 | Chang et al. | 455/446 |
| 2004/0202135 | A1 | * | 10/2004 | Han et al. | 370/332 |
| 2006/0153151 | A1 | | 7/2006 | Huang et al. | |
| 2011/0096687 | A1 | * | 4/2011 | Dottling et al. | 370/252 |
| 2011/0305180 | A1 | * | 12/2011 | Osterling | 370/311 |

FOREIGN PATENT DOCUMENTS

| JP | 2006-352477 | 12/2006 |
| WO | 2009/115554 | 9/2009 |

OTHER PUBLICATIONS

International Search Report and Written Opinion of the International Searching Authority dated Feb. 17, 2011, from corresponding International Application No. PCT/EP2010/059319.
NEC. "Adding high-level description of the capacity-limited network use case to ESM stage 1 TS" 3GPP TSG-SA5 (Telecom Management), Meeting SA5#71, May 10-14, 2010.

(Continued)

*Primary Examiner* — Charles Appiah
*Assistant Examiner* — Jaime Holliday
(74) *Attorney, Agent, or Firm* — Katten Muchin Rosenman LLP

(57) ABSTRACT

The invention relates to a method in a cluster of cells in a communications network comprising switching between a first state, in which a first number of radio stations is active and a second state in which a second, different number of radio stations is active, wherein the second state is intended to provide the same geographic coverage as the first state but a different capacity, and in which the transition between states is carried out using transmission parameter adjustment, which take place in a plurality of radio stations and are coordinated in time for these radio stations.

14 Claims, 12 Drawing Sheets

(56) References Cited

OTHER PUBLICATIONS

3GPP TR 32.826 V2.0.0 3rd Generation Partnership Project; Technical Specification Group Services and System Aspects; Telecommunication management; Study on Energy Savings Management (ESM) (Release 9), Mar. 2010.

Nokia Siemens Networks, Nokia. "Considerations on 36.902s Interference Reduction Use Case" 3GPP TSG-RAN WG3 Meeting #60, May 5-9, 2008.

Huawei, Zte, China Unicom. "Discussion on Gradually Cell Switch off/on" 3GPP TSG-RAN WG3#65bis, Oct. 12-15, 2009.

Notification of Reason(s) for Refusal dated Dec. 3, 2013, from corresponding Japanese Application No. 2013-517037.

* cited by examiner

TRANSITION MECHANISM FOR ENERGY EFFICIENT MOBILE OVERLAY NETWORK

The present invention relates to wireless communication systems. The radio network planning for mobile systems such as CDMA or OFDMA based systems including 3GPP-LTE, WCDMA, 802.16e-2005 and 802.16m is primarily based on geographical coverage and capacity (data throughput) requirements of the network. For regions with high-density of subscribers, for example dense-urban, urban or sub-urban, capacity is more often the determining factor for the cell radius provided and hence the cell-site density. Thus, the cell radius provided by a single radio station (or base station or relay station) is likely to be smaller than the actual radio coverage that can be supported by that radio station. However, the temporal traffic load variation and other factors can allow for some of the radio stations to be switched off during the times of low traffic demand without affecting the coverage. Switching off some radio stations periodically can be referred to as an overlay technique or scheme, because two layers can be visualised: a denser layer, when all the radio station are transmitting and a more sparse layer, when some of the radio stations are switched off, for example at a time of low wireless service demand.

A network planned to support such an overlay scheme can lead to savings in power consumption thereby reducing the carbon footprint as well as operating expense (OPEX) for the operators. Such an overlay network technique has been widely proposed and discussed within the mobile broadband industry for the purpose of power saving. It can be implemented for a number of different configurations depending on the resources available to the operator. One such example configuration is illustrated in FIG. 1. Figure shows a network 1 in two different states. On the left, the lower capacity state is shown. This lower capacity state takes effect at the highlighted times depicted in the time diagram shown on the left, producing larger cells 3, with only some radio stations 2 active. Each active radio station 2 produces a cell 3. Active radio stations are shown larger than the inactive radio stations 4 in the diagram. At times of higher demand, the network is switched to the higher capacity state shown on the right, with the corresponding time diagram and reduced cell size. All the radio stations 2, 4 are active, and they are all illustrated having the same size and producing a cell 3. In the transition between the two states the cell size reduces, here from 1000 m to 433 m.

The example scenario in FIG. 1 considers the case where the traffic demand over a 24-hour period exceeds a given threshold for 12 hours of the day and remains below the threshold for the remaining 12 hour period, as shown in the time diagrams. For a capacity constrained deployment as explained above, it is possible to switch off certain radio stations without affecting coverage and still meet the traffic demand during the period when the traffic falls below a certain threshold. For the purpose of distinction, the radio stations which remain on in both states can be referred to as "macro" radio stations and the radio stations that remain on only in the higher capacity state (during high traffic demand) can be referred to as micro radio stations. Thus the 2 tiers (or layers) of the overlay network are formed. In the higher capacity state all the radio stations are on; in the lower capacity state only the macro radio stations are on.

Note that in this example, the coverage for the macro radio stations in FIG. 1 is similar to that of the micro radio stations while they are still on but increases when the micro radio stations are switched off in order to maintain the overall network coverage.

R3-092787, Huawei, ZTE, China Unicom, "Discussion on Gradually Cell Switch off/on", 3GPP TSG-RAN WG3#65bis, October 2009, refers to overlay schemes and provides a concept for the transition betweens stage whereby the cell being switched off ramps the transmit power up or down in order to control user equipment handover between cells during the transition. However, the inventors have come to the realisation that practical implementation of the transition may require more input than controlled adjustment of the power parameter of the cell switching on or off.

Embodiments of the invention provide a method of automatic state transition in a cluster of cells in a communications network comprising switching between a first state, in which a first number of radio stations is active and a second state in which a second, different number of radio stations is active, wherein the second state is intended to provide the same geographic coverage as the first state but a different capacity, and in which the transition between states is carried out using transmission parameter adjustment, the transmission parameter adjustment taking place in a plurality of radio stations and being co-ordinated in time for all these radio stations.

A key aspect in the practical implementation of an energy saving overlay network is the transition in which one or more of the radio stations (also commonly referred to by the equivalent terms radio base station, base station BS or eNB, but including a relay station) in a cluster (or group) of cells is switched on or off. The inventors have realised that in the transition more than one radio station should adjust its transmission parameters and that the adjustment in the radio stations should be coordinated, so that for example coordinated steps will take place in a plurality of radio stations (although each step may take place in one radio station only). For instance, at least the neighbouring radio stations in the cluster to a radio station which is switching on or off may have to adapt their own radio parameters in coordination with the switch.

During the transition, the radio propagation properties within the network will change and this may lead to potential radio link failures or dropped calls for user equipments (UEs) in the cluster. Moreover, since the transition also involves a change in the number of available radio stations, it can also lead to an unwanted and uncontrolled surge in handover (HO) activity within the cluster irrespective of the mobility state of active UEs (which mobility state triggers handover in many other situations). From these considerations, the inventors have perceived that radio station coordination is advantageous, so that certain relative timings of the transmission parameter adjustments in the radio stations are defined. This co-ordination has the aim of ensuring that the radio link is maintained during the transition and handover is successfully handled for all UEs migrating from a micro to a macro radio station or vice-versa during the transition.

Invention embodiments provide a solution for the transition mechanism which includes an automatic and coordinated parameter adjustment for the transition in the cluster from off to on (lower state to higher state) or on to off (higher state to lower state) with the aims that the UEs do not lose coverage or experience Radio Link Failure (RLF); and that the UEs undergo a smooth handover without experiencing HO related RLF or RACH conflicts, which are explained in more detail later.

DEFINITIONS

The term 'cluster' here includes a group of at least two radio stations within the network which is considered collectively and preferably independently for the purposes of the state transitions discussed herein. Thus in the simplest embodiment, a cluster of two radio stations may be provided, with one of them being switched off and the other adapting its own radio parameters in a coordinated transition between two states.

The skilled reader will appreciate that there may be some minor variation in geographic coverage between the two states, but that the primary change between the two states is in the number of active radio stations in a given geographical area and thus in the capacity for supporting UE communication. The UEs referred to herein may be mobile or fixed telephones, PDAs, laptop computers and/or any other devices served by the radio stations providing a cell over a wireless link.

The transition between two states may include one or more individual coordinated steps in which transmission parameters are adjusted. The number of coordinated steps in the transition may be determined by the expected number of UE handovers expected to be produced by the transition. Thus, if the number of handovers is expected to be low enough to be handled by available uplink/downlink (UL/DL) control plane resources, then the number of coordinated steps in any transmission parameter adjustment may be reduced, in theory to one. For a transition to a higher capacity state, this single step may involve at least one radio station being switched on as part of a co-ordinated transmission parameter adjustment in several radio stations. Alternatively, the particular step of switching the radio station on may not be coordinated (for example if it will not lead to any UE handovers, for any reason). In a transition to a lower capacity state, at least one radio station is switched off. In contrast to the switch on transition, the switch off is unlikely to be coordinated. In the vast majority of cases, the switch off will take place after one or more steps of co-ordinated parameter adjustment, to allow all UEs attached to the radio station that is to switch off to handover beforehand.

Each step in the transition may be the same size as the others in terms of the amount of coverage adjustment with the possible exception of a final switch off step or initial switch on step. A separate switch off step (as described above) may be preceded by a forced handover of UEs still attached to the base station that is switching off. Thus the switch off is likely to be the only step in the transition to a lower capacity state which is not necessarily coordinated between radio stations. However, as indicated above, the switch on step could conceivably immediately trigger UE handover and is more likely to be coordinated.

A given step may be much larger than other steps if the number of active UEs within the affected ring is very low (this is determined by UE distribution profile, which will be discussed in more detail later). This has the advantage of enabling faster state transition times by adapting the process for the number of active UEs.

The step interval (in time) may be defined based on the anticipated time required for the handover procedure to complete for all active mode UEs in a given step. However, since the step size is controlled so as to limit the expected number of handovers, the step interval may in fact be constant across different steps.

To achieve the required step interval, preferably at least one step of transmission parameter adjustment is followed by a timed delay, 't'. This delay may be provided for each step with the possible exception of the switch off step. Such a timed delay is highly advantageous, because it can be used to allow sufficient handover time for the expected UE handovers before the next step takes place (or in the case of the last step in any transmission parameter adjustment, before the next stage of the transition). The inventors have realised that without such time synchronization, the radio coverage may not change as expected or planned, therefore leading to possible Radio Link Failures for UEs thus impacting the QoS.

The value of 't' can be constant or individually set for each step in which it is implemented and should preferably be more than or equal to the total time required to complete the handover process for all the handovers that are expected or initiated as a result of the step change. For example, in case of 3GPP-LTE, the handover process may happen over the S1 or X2 interface and for each UE, 't' would include the time from the HO event for reporting measurement for HO, Time to Trigger, HO Command & Acknowledgement, Status/Resource transfer to Target eNB and finally until release of resources at Source eNB.

The transmission parameters which may be adjusted in each step include transmission power, antenna downtilt (also referred to simply as tilt or antenna tilt), power on/off and any other suitable transmission parameters such as height of antenna and azimuth of antenna. These latter two are not considered in detail for the following reasons:

1. Height and/or Azimuth may not be adjustable remotely. Even if a software command (or electrical signal) is able to actuate a motor (leading to mechanical movement either linear or angular), moving parts are more prone to failures and therefore their adjustment not always recommended.
2. Currently, neither height nor azimuth of the antenna is sufficient in itself for a transition between states and both would need to be performed together with power and/or tilt adjustment.

In many embodiments both transmission power and antenna downtilt are adjusted. Although it is possible to adjust these two parameters simultaneously (that is, in a single step) for any radio station, this is usually disadvantageous due to the possible collective impact on coverage (which might trigger uncontrolled handovers). Thus preferably transmission power and tilt are adjusted in sequential steps of transmission parameter adjustment, highly preferably separated by a delay as set out above. Transmission power and antenna tilt may be adjusted in either order.

Invention embodiments can extend to a cluster in a communications network that can switch between more than two states (or layers) whereby all of the radio stations are active in the highest state (state with the highest capacity requirement) and the radio station site density reduces for lower states. This can potentially provide further optimization in energy saving by allowing better flexibility in adapting the network configuration with respect to variation in the traffic demand. Thus methods according to invention embodiments may include switching between the second state and a third state, in which a third state a further different number of radio stations is active. The third state is intended to provide the same geographic coverage as the first and second states but a different capacity. The transition between the second and the third states again is carried out using transmission parameter adjustment, which takes place in a plurality of radio stations and is co-ordinated in time for all these radio stations. The skilled reader will appreciate that the switch between any two states takes place in the same way as the switch between the first and the second state.

If there are more than two states which can be considered in an order of increasing/decreasing capacity, then it is also possible for a switch between non-consecutive states to take place. That is, it is possible to change the state from 'n' to 'n+m' or from 'n' to 'n−m' where m>1. Such a change may be determined by the traffic load and could occur when the change in traffic load (capacity requirement) is rapid rather than gradual As set out above, in any transition between states, the radio stations which remain on in both states can be referred to as "macro" radio stations and the radio stations that remain on only in the higher capacity state (during high traffic demand) can be referred to as micro radio stations. The higher capacity state may be referred to as "micro mode" (because the micro radio stations are active) and the lower capacity state maybe referred to as macro mode (because only the macro radio stations are active). The following explanation relates to a plurality of macro radio stations and a plurality of micro radio stations in each cluster, but the skilled reader will appreciate that there may in fact be a single micro radio station and a single micro radio station in a cluster. The only requirement is that there is at least one micro radio station and at least one macro radio station in a cluster.

Thus, using LTE terminology, a given eNB may act as a macro eNB in state n (the highest capacity state), and state n−1 but become a micro eNB in State n−2. This is because, as the state reduces, the number of active eNBs reduces within the cluster. This switch from acting as a macro radio station to acting as a micro radio station is determined by the parameters defined for each radio station within the cluster for all states. Preferably, the parameter values can be defined independently for each radio station within the cluster, so that it is possible for an eNB (or radio station of another technology) to remain unaffected by a switch, that is to act as neither a macro nor a micro radio station for that particular transition.

Conveniently, all the macro radio stations in a cluster adjust their transmission parameters together (in at least one step) and all the micro radio stations adjust their transmission parameters together (in at least one step). The adjustment is thus in parallel, so at least substantially simultaneously. The timed delays mentioned above can be used to help ensure that the adjustment is indeed synchronised between the radio stations involved. In many embodiments, each of the transmission parameter adjustment steps, including the final switch on/off step are carried out together by the radio stations of each type.

In some preferred embodiments the transmission parameter adjustment for a transition between two states is carried out in sequential, co-ordinated stages, a first stage for all transmission parameter adjustment for the or (if there is more than one) each micro radio station or macro radio station and a second stage for all transmission parameter adjustment for the or each macro radio station or micro radio station respectively. Preferably, in a switch to a higher demand state, transmission of the or each micro radio station is adjusted in the first stage and in a switch to a lower demand state, transmission of the or each macro radio station is adjusted in the first stage. This allows an initial increase in capacity in the radio station to which UEs will transfer during the transition. Furthermore, it also allows the UE handover to complete during the transition before a radio link failure can occur due to the change in coverage In other preferred embodiments, the macro and micro radio stations adjust their transmission parameters together. For example, both types of radio station may first adjust transmission power (for example in one or more steps) and then adjust antenna tilt (again in one or more steps). The timed delays mentioned above can be used to ensure that the adjustment is indeed synchronised between the radio stations involved.

Preferably, the cluster has access to a coordinating server or other coordinating entity which coordinates the switching actions of the radio stations within the cluster during the transition, preferably by signalling the radio stations to adjust their transmission parameters at (a) given time(s). The start of this signalling may be in response to a trigger. The coordinating server may also request the UE distribution profile (as explained in more detail later) from some or all of the radio stations and may also instruct the radio stations as to the step intervals.

The method may be triggered by traffic load or traffic demand crossing a particular threshold or by any other suitable trigger. Preferably, the method may be cancelled at any point by reversing the transition process. This action may be suitable if, for example, the trigger becomes invalid. For example the traffic load or traffic demand may cross the particular threshold in the opposite direction during the transition procedure. The advantage of such a cancellation possibility is to minimise the turnaround time in cases of false trigger. This is best implemented if it can be actioned before any further adjustment in the method takes place. Reversing the transition process involves carrying out the opposite operations to those taken up until the cancellation, preferably in the opposite order.

Embodiments of a further aspect of the invention relate to a communications network including a cluster of radio stations being operable to switch between a first state, in which a first number of radio stations is active and a second state in which a second, different number of radio stations is active, in which the second state is intended to provide the same geographic coverage as the first state but a different capacity; wherein the radio stations are operable to carry out the transition between states using transmission parameter adjustment, wherein the transmission parameter adjustment takes place in a plurality of radio stations and is co-ordinated in time for these radio stations.

Embodiments of a still further aspect of the invention relate to a radio station in a cluster of radio stations in a communications network, the cluster being operable to switch between a first state, in which a first number of radio stations is active and a second state in which a second, different number of radio stations is active, in which the second state is intended to provide the same geographic coverage as the first state but a different capacity; wherein the radio station includes control functionality to carry out the transition between states using transmission parameter adjustment, with timing specified so that the transmission parameter adjustment takes place in co-ordination with other radio stations in the cluster. The radio station may include a coordinating entity which coordinates the actions of all the radio stations within the cluster during the transition, preferably by signalling the radio stations to adjust their transmission parameters. The radio station may act as a micro radio station or as a macro radio station, or both (at different state transitions as explained previously).

Embodiments of a further aspect of the invention relate to a coordinating entity operable to control a transition in a cluster of radio stations of a communications network, by coordinating a switch between a first state, in which a first number of radio stations is active and a second state in which a second, different number of radio stations is active, in which the second state is intended to provide the same geographic coverage as the first state but a different capacity; wherein the coordinating entity includes functionality to instruct the radio stations to carry out the transition between states using transmission parameter adjustment, wherein the instructed transmission parameter adjustment takes place in a plurality of radio stations and is co-ordinated in time for these radio stations.

The coordinating entity may include memory and a calculator (processor) used, for example, to calculate whether a threshold for activation of the transition has been crossed. It may optionally include a receiver to receive data from the radio stations (such as traffic activity for each radio station and a geographic distribution of active UEs served by each radio station) and a transmitter to provide the radio stations with instructions (depending on its location in the network). The calculator may also use the geographic distribution of active UEs served by each radio station, if available, to determine the step size and timed delay per step, for transmission of these stepping parameters to the radio stations.

Features and preferable features of any and all of the above aspects may be combined.

Preferred features of embodiments of the present invention will now be described, purely by way of example, with reference to the accompanying drawings, in which:—

FIG. 3 shows a different embodiment of the invention in the form of a flow chart;

FIG. 6 shows the signalling between an SON server and all the radio stations in a cluster during the transition from micro mode to macro mode;

FIG. 7 shows one sequence of events in the radio base stations during the transition from micro mode to macro mode according to a first option;

FIG. 8 shows another sequence of events in the radio base stations during the transition from micro mode to macro mode according to a second option;

FIG. 9 shows the signalling between an SON server and all the radio stations in a cluster during the transition from macro mode to micro mode;

FIG. 10 shows one sequence of events in the radio stations during the transition from macro mode to micro mode according to a first option;

FIG. 11 shows another sequence of events in the radio base stations during the transition from macro mode to micro mode according to a second option;

Figure 13:
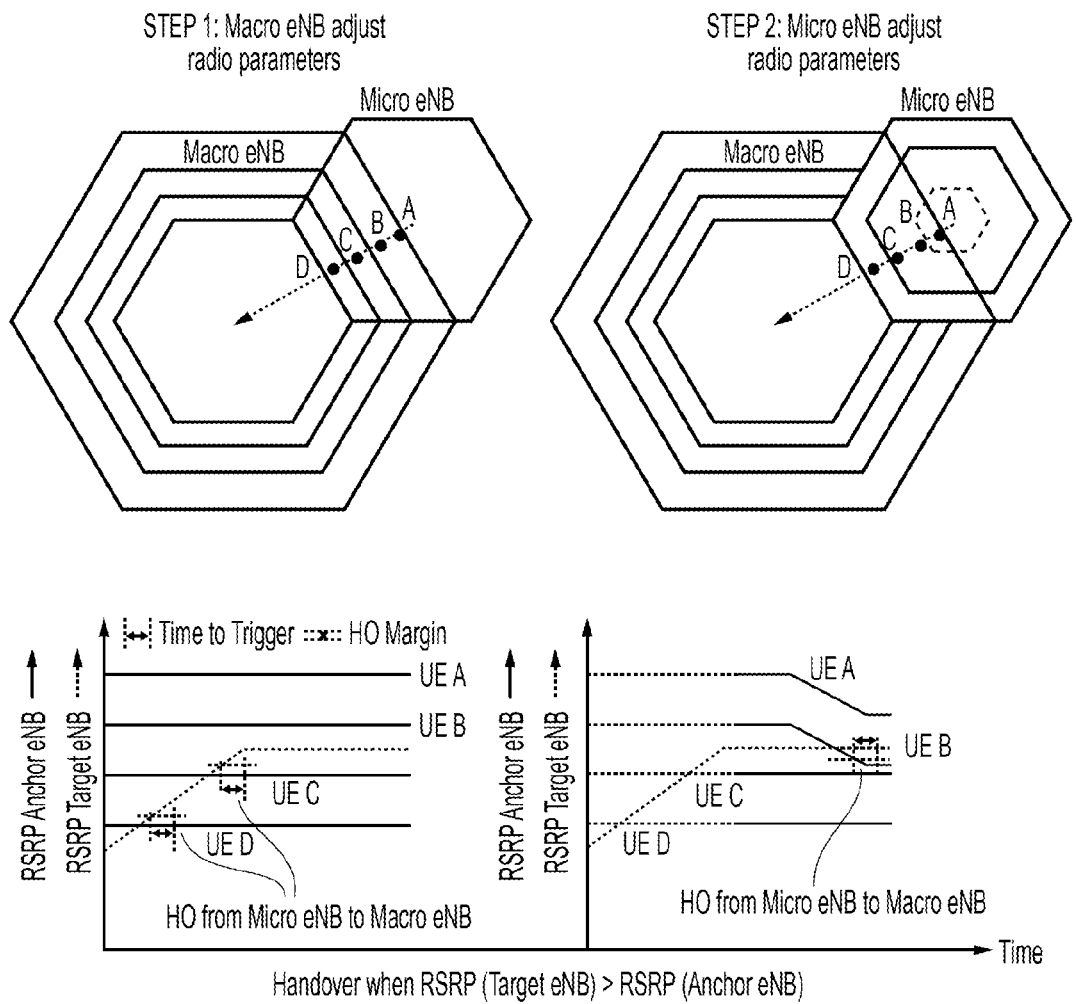

FIG. 13 includes two geographic diagrams and corresponding graphs illustrating a state transition according to a first option.

According to embodiments of the invention, in order to achieve the desired radio coverage when one or more radio stations are switched on or off, radio parameters such as transmit power & antenna downtilt are adjusted for at least one other radio station during the on/off transition. The adjustment is co-ordinated between the radio stations involved.

Figure 1:
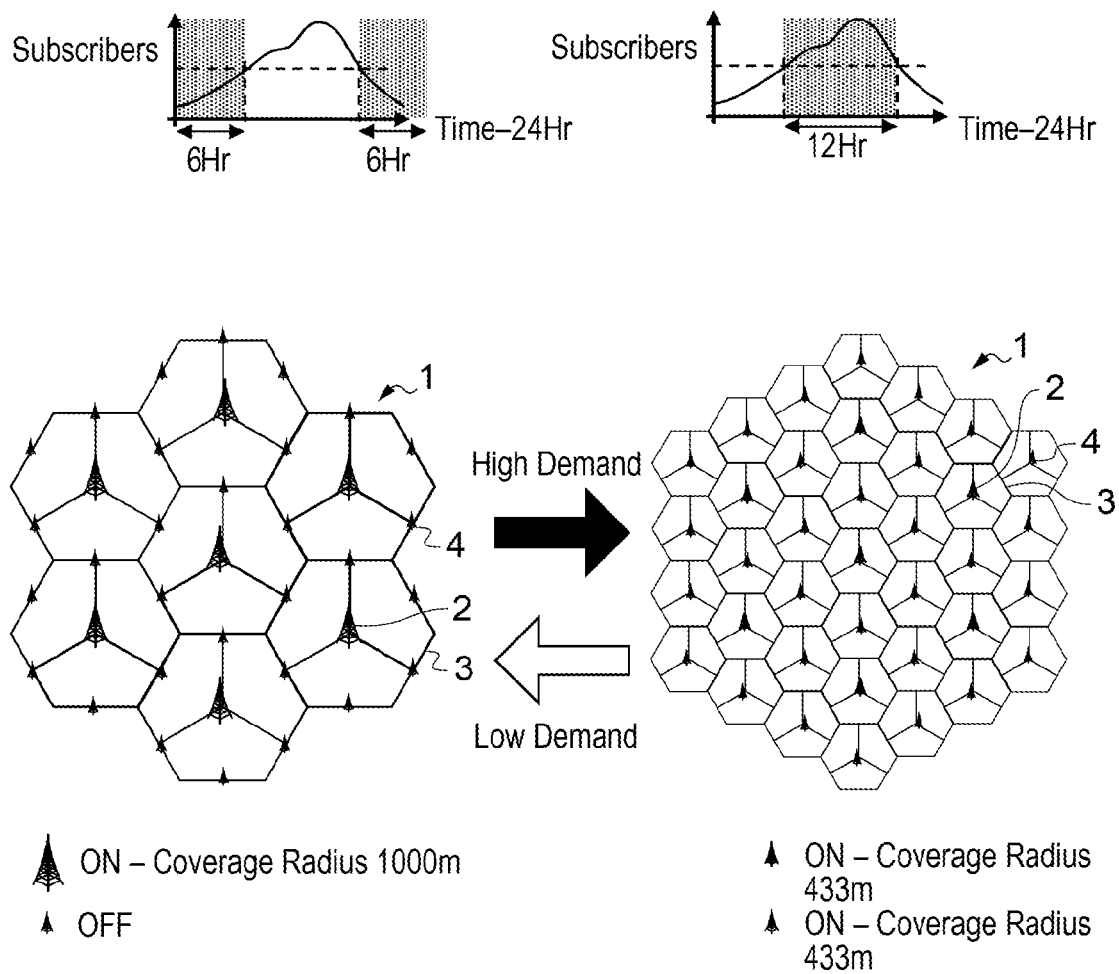
FIG. 1 shows an overlay network concept in a lower capacity state and in a higher capacity state.
Figure 2A:
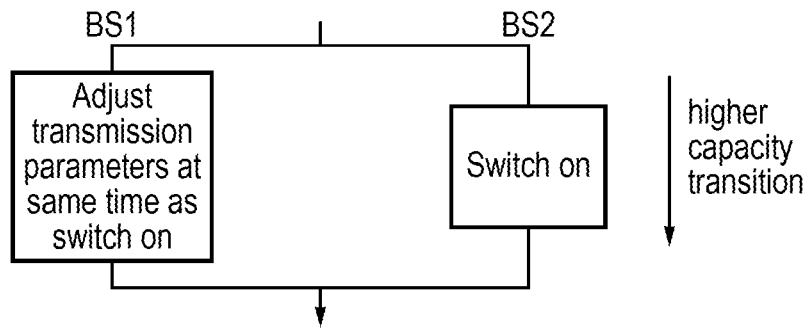
FIGS. 2a, 2b and 2c and 3 show simple generic embodiments of the invention in the form of flow charts.
Figure 2B:
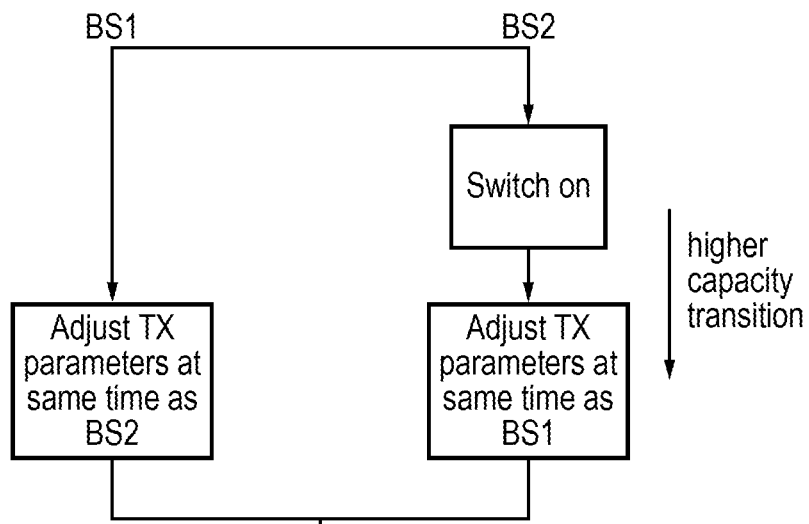
Figure 2C:
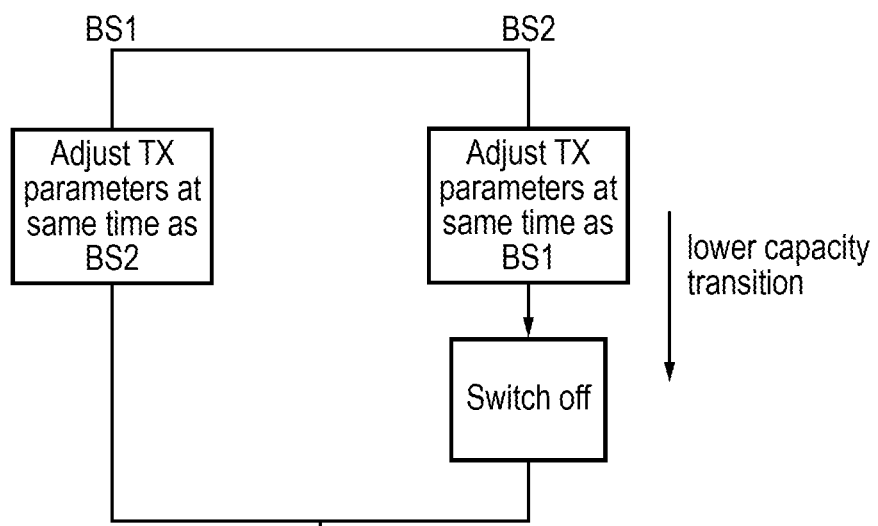
Figure 3:
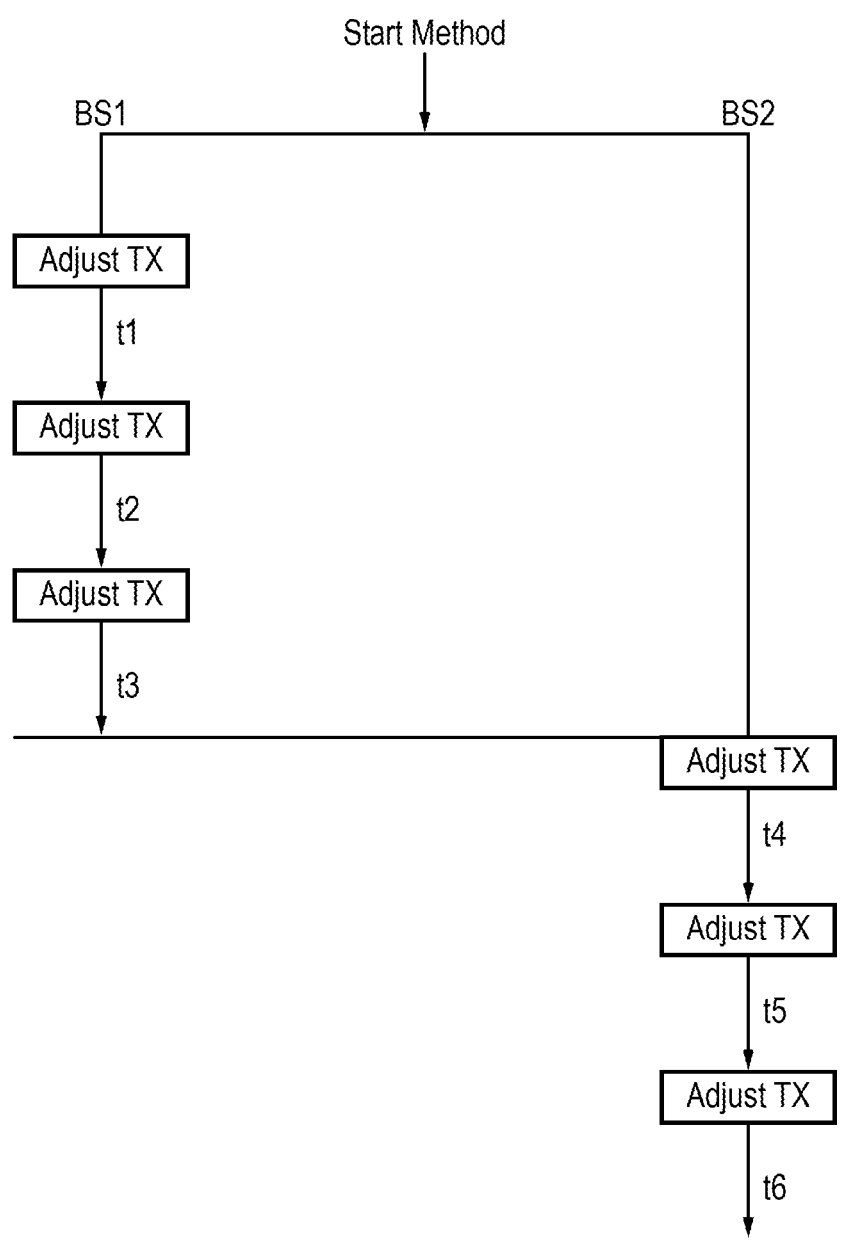

FIGS. 2 and 3 illustrate simple general embodiments of the invention. FIGS. 2a, 2b and 2c shows scenarios involving two radio stations, BS1 and BS2 and illustrate a simple transition with a single coordinated transmission parameter adjustment.

Here, BS2 switches off or on and BS1 adjusts its transmission parameters simultaneously with BS2. BS2 acts as a micro radio station which only transmits in a higher capacity state and BS1 acts as a macro radio station which adjusts its transmission in coordination with BS2. The transmission parameter adjustment in BS1 may be, for example, antenna tilt or transmission power. The transmission parameter changed in BS2 may also be antenna tilt or transmission power, including switching transmission power on.

In FIG. 2a, power is switched on in BS2 and at substantially the same time a transmission parameter adjustment in BS1 takes place, to make a transition to a higher capacity in a single coordinated step. Alternatively, FIG. 2b shows a separate switch on, which is not coordinated and a subsequent single coordinated transmission parameter adjustment step in BS1 and BS2, to make the transition to a higher capacity. FIG. 2c shows a transition to a lower capacity in a single coordinated step, followed by a switch off step.

FIG. 3 again shows a scenario with two radio stations, BS1 and BS2. Here, the adjustment of parameters is co-ordinated in that BS2 waits until BS1 has finished adjustment before adjusting its own parameter(s). This scenario involves adjustment in a plurality of steps (whose timing with respect to at least one other step is thus predetermined). Each coordinated step is followed by an individual timed delay to allow for UE handover. The individual steps may involve adjustment of transmission power and/or antenna downtilt. However, if BS2 is to act as a micro radio station, one of the steps shown for BS2 or a earlier/subsequent step must result in the radio station switching on/off for a transition between states.

The scenario in which the overlay network configurations of invention embodiments may be used is particularly appropriate when the operator has license(s) for providing mobile service on a single RAT (radio access technology) and orthogonal resource (that is non-interfering frequency bandwidth) is not available to provide different capacity without adjustment of neighbouring cells.

If a network operator already provides mobile service through the technology "X" (example WCDMA) it is likely that they will already have 100% coverage in the area being served. If the operator subsequently acquires the spectrum to provide mobile service through technology "Y" (example LTE Rel-09) and thus license to provide service on more than one RAT technology; it is most likely that the acquired spectrum is different than that being used for "X". In order to expand capacity, an "overlay network" may be deployed with technology "Y". Thus both networks "X" & "Y" co-exist and do not interfere with each other. In such a case, if the operator wishes to switch off any radio station (eNB or base station in other terminology) of technology "Y", the capacity may get affected but the coverage is still maintained through "X" without any adjustment or planning. Thus, switching off for energy saving can be implemented without adjustments to maintain coverage.

Suppose a network operator has license to provide mobile service through technology "X" only. However, with license for sufficient spectrum (say 30 MHz), the operator may be able to split it into two carriers, "A" with bandwidth 20 MHz & "B" with (orthogonal) bandwidth 10 MHz. Further, the operator may plan the network such that some eNBs operate at "A" and provide full coverage and some eNBs operate at "B" and provide full or part coverage but add to the capacity already being provided by eNBs operating at "A". Again, this is similar to an overlay network where full coverage is provided by at least one part of the network ("A" here) with or without the presence of overlaid network ("B" here). This is because there is no interference between the two due to orthogonal frequency resource. Thus, again switching off any eNB at "B" is easy to implement without having to make adjustment to maintain coverage.

Invention embodiments may not necessarily be applied in the two above examples, since they do not necessarily derive any benefit from parameter adjustment of a plurality of radio stations, for example to maintain coverage during state transition.

Triggering the Transition Between States

The transition between states in an overlay network according to invention embodiments is triggered dynamically depending on the temporal variation in the traffic demand such that the radio parameters are adapted for operation in the relevant state. The solution can rely on an entity to:
1. determine the time instant when the Micro←→Macro transition trigger should be applied and;
2. exchange signalling messages with radio base stations to implement such a transition with minimal or no impact on the UE's quality of service.

Such an entity is hereafter referred to as the "SON server" (for Self Optimising Network server), using LTE terminology, but this terminology is not intended to be restrictive. The SON Server may be responsible for co-ordination of one set of eNBs (a single cluster) or multiple sets of eNBs (more than one cluster). Strictly speaking, it may be seen as a central entity with respect to one or more clusters but not necessarily with respect to the entire network or even with respect to the part of the network that employs an energy saving switch off/overlay procedure. The SON server may reside either in one of the radio base stations of the network or within another central network entity like the OAM or the MME/S-GW. These examples are illustrated in FIGS. 4 and 5 for a 3GPP Rel 9 based system, with information exchange between the SON server and eNB taking place over the depicted interfaces.

Figure 4:
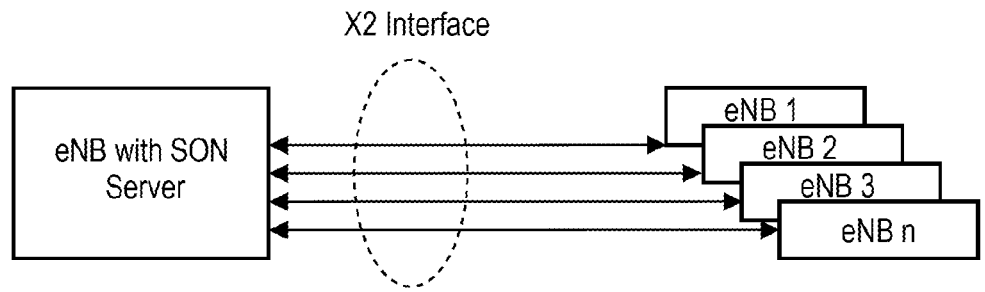
FIG. 4 is a schematic diagram of an LTE example with an SON server in a radio station.

FIG. 4 shows an LTE Example in which the SON Server resides in a radio base-station (a distributed configuration). Communication between the SON server and the radio stations which do not include the SON server is over the X2 interface between radio stations. There are "x" number of clusters within the network (where switch off is employed), and each cluster contains a number of eNBs. As one option, one eNB from each cluster may be nominated as a master that performs the functions of the SON Server for its individual cluster (in addition to its function as an eNB). As another option, one eNB from any of the x clusters may be nominated as a Master and performs the functions of SON Server for the cluster that it belongs as well some neighbouring clusters (in addition to its function as an eNB). The choice of any of the options would typically depend on factors like the size of the cluster, backhaul capacity, and implementation complexity and other network factors.

Figure 5:
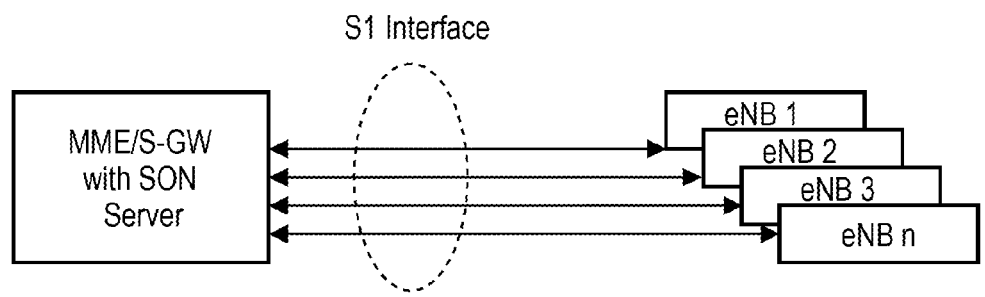
FIG. 5 is a schematic diagram of an LTE example with a SON server in the MME/S-GW.

FIG. 5 shows an LTE Example in which the SON Server resides in an MME/S-GW (a centralized/hybrid configuration). Thus communication between the SON server and all the radio stations is over the S1 interface.

Prior to the transition, relevant radio parameters such as transmit power and antenna downtilt are initialized for all radio stations for all applicable states of operation. This is to ensure that the network will be able to meet the radio and coverage requirements of the network both before and after the on/off transition. Thus the parameters for different states in an overlay scheme according to invention embodiments are pre-defined. Mechanisms for arriving at pre-defined values are known in the art. For example, one suitable method could be trial operation in all states and another could be using a radio planning/optimization tool that has been calibrated for the network to be able to generate sufficiently accurate predictions Explanation of a Cluster The traffic load in a given network region is not uniform in either space or time. For example, the presence of motorways, theatres, schools, business complexes, etc will impact the traffic load pattern in any network area. The overlay mechanism of invention embodiments relies on few eNBs to switch off or on while the neighbouring eNBs compensate for the change in coverage. Thus, this overlay mechanism needs to be applied to a group of eNBs rather than individual eNBs. However, due to spatial & temporal variation in traffic loads, applying the on-off transitions to the entire network may not be an optimum or even feasible solution. Therefore, the network is broken into smaller clusters (groups of eNBs) which may be assumed to have more or less correlated traffic load variation among all its constituent eNBs. These clusters will have a minimum size granularity (based on a number of neighbours required to implement an overlay scheme). However, there may not be an upper limit to the number of eNBs.

The minimum size of a cluster is determined by the density of radio stations in the network and the general network planning concepts. For example, if the radio stations are very close to each other (for example in a dense-urban environment), then for each radio station that is turned off, only 2 or 3 neighboring radio stations may be sufficient to compensate for the affected coverage and consequently the minimum cluster size may be as small as only 3 radio stations. However, if the inter-site distance is relatively larger (for example in a sub-urban scenario), then up to 6 radio stations may be required to compensate for the coverage of an individual radio station being switched off. In such case, the minimum cluster size will have to be about 7 or more radio stations.

Moreover, there is no reason for these clusters to remain static. As an example, on weekdays, a region can be broken into "x" number of clusters (not necessarily of the same size) while on the weekends, the same region may be broken into a different number "y" of clusters (again, not necessarily of the same size).

The coordinated state transition process applies to all the radio stations in a given cluster; however, each cluster is independently treated by an individual or common SON Server.

Thus the term "cluster" implies at least part of the network; and in the rare case that the entire network is treated as a single cluster, then that implies the entire network.

States of Operation in the Overlay Network

As mentioned above, the radio base stations in the cluster may operate in any of the applicable states with pre-defined Transmit Power and Antenna Downtilt parameters. For example, in a cluster that operates in 'n' states, the power and downtilt parameters may be defined for each of the eNBs which are active in the nth state as per Table 1, shown below. The minimum state is represented by n==1.

TABLE 1

| | | Cluster State | | | |
|---|---|---|---|---|---|
| | | State 1 | State 2 | ... State 'n – 1' | State 'n' |
| Radio Station State within the cluster | BS 1 | Active | Active | ... Active | Active |
| | BS 2 | OFF | Active | ... Active | Active |
| | . | ... | ... | ... ... | ... |
| | . | | | | |
| | . | ... | ... | ... | ... |
| | . | | | | |
| | . | ... | ... | ... | ... |
| | . | | | | |
| | BS 'x' | OFF | OFF | ... Active | Active |
| | BS 'x + 1' | OFF | OFF | ... OFF | Active |

Table 1 shows the state matrix table for 'x+1' radio stations (denoted by label 'BS') within a cluster that operates in 'n' different states. Those radio stations that are OFF in any state of the cluster will not have any valid parameters (i.e. Transmit Power or Antenna Tilt) for such states. However, for the purpose of transition (to or from switched OFF state), the parameter values for such radio stations may need to change to a different value just before or after switching OFF.

Thus Table 2 lists the parameter values $P_{a,b}$ $T_{a,b}$ where the first suffix 'a' denotes the radio station ID and the second suffix 'b' denotes the cluster state ID for parameters Transmit Power and Antenna Tilt respectively. Note that when b==0, it indicates the parameter value assumed by the radio station just before switching off or after switching on during the transition procedure.

TABLE 2

Radio Station Parameter values for Cluster States

| | | Cluster State | | | |
|---|---|---|---|---|---|
| | | State 1 | State 2 | ... State 'n − 1' | State 'n' |
| Radio Station parameter values | BS 1 | $P_{1,1} T_{1,1}$ | $P_{1,2} T_{1,2}$ | ... $P_{1,n-1} T_{1,n-1}$ | $P_{1,n} T_{1,n}$ |
| | BS 2 | $P_{2,0} T_{2,0}$ | $P_{2,2} T_{2,2}$ | ... $P_{1,n-1} T_{2,n-1}$ | $P_{2,n} T_{2,n}$ |
| | . | ... | ... | ... ... | ... |
| | . | ... | ... | ... ... | ... |
| | . | ... | ... | ... ... | ... |
| | BS 'x' | $P_{x,0} T_{x,0}$ | $P_{x,0} T_{x,0}$ | ... $P_{x,n-1} T_{x,n-1}$ | $P_{x,n} T_{x,n}$ |
| | BS 'x + 1' | $P_{x+1,0} T_{x+1,0}$ | $P_{x+1,0} T_{x+1,0}$ | ... $P_{x+1,0} T_{x+1,0}$ | $P_{x+1,n} T_{x+1,n}$ |

Based on Table 1 & 2, two examples of the parameter adjustment for different radio stations are shown below for different examples of state transitions when the capacity is reduced for the cluster. The reverse will apply for when the transition is from lower capacity to higher capacity state:

1. Cluster State transition from '2' to '1'
   a. BS1: $P_{1,2} T_{1,2} \rightarrow P_{1,1} T_{1,1}$
   b. BS 2: $P_{2,2} T_{2,2} \rightarrow P_{2,0} T_{2,0} \rightarrow$ OFF
   c. BS 'x' & 'x+1: Do not participate (Remain switched OFF)

2. Cluster State transition from 'n' to '2'
   a. BS1: $P_{1,n} T_{1,n} \rightarrow P_{1,2} T_{1,2}$
   b. BS 2: $P_{2,n} T_{2,n} \rightarrow P_{2,2} T_{2,2}$
   c. BS 'x': $P_{x,n} T_{x,n} \rightarrow P_{x,0} T_{x,0} \rightarrow$ OFF
   d. BS 'x+1': $P_{x+1,n} T_{x+1} \rightarrow P_{x+1,0} T_{x+1,0} \rightarrow$ OFF If we consider a twin-state cluster in an overlay network, then n=2 for that cluster, i.e. the cluster operates in only two states: State 1 and State 2 such that:

In State 1, some of the radio base stations within the cluster are in active mode, let the number be 'x'. One such radio station operates at Transmit Power P1 & Antenna Downtilt T1.

In State 2, all the radio base stations within the cluster are in active mode, let the number be 'y' such that 'y'>'x', (a higher capacity state) and operate at Transmit Power P2 & Antenna Downtilt T2.

Assume, base-station BS1, i.e. i=1 remains active in both States 1 & 2 (Macro) whereas base-station BS2, i.e. i=2 remains active only in State 2 (Micro). In such a scenario, the radio parameters for the radio stations are affected in the following manner:

During transition from State 2→State 1:

BS2 will modify radio parameters from P22 to P20 & T22 to T20 and then switch off BS1 will modify radio parameters from P12 to P11 & T12 to T11 and remain active During transition from State 1→State 2:

The inactive radio base stations BS2 will Switch ON and modify radio parameters from P20 to P22 & T20 to T22

Active radio base stations BS1 will modify radio parameters from P11 to P12 & T11 to T12

Thus, if there are only two states, a Macro eNB will transition from state n==2 to n==1 with values corresponding to these states and shown in table 2. Therefore, BS1 changes from P12 to P11.

However, a Micro eNB does not operate at all in State n==1 (since it switches OFF). State 0 defines such a distinction, i.e. State 0 signifies that eNB Switches OFF instead of operating or remaining active at values corresponding to n==1. The values defined for State 0 for a Micro eNB may be same as those for State 2 (that is no parameter adjustment before switching off), or it may be different than those at State n==2. Thus, in the given example, BS 2 changes from P22 to P20.

The parameter values at State 1 for BS 2 may be viewed as "N/A". Likewise, parameter values at State 0 for BS1 are "N/A".

The radio station which needs to switch on may not be able to switch on directly in a state of its final operation. This is because, as soon as a radio station is activated, it may lead to handover attempts by a larger number of UEs than can be supported by the radio stations.

Therefore, the parameter values specified for state 0 represent the (power and downtilt) values at which the Switched off radio station should initially apply. Thereafter, the final value (i.e. values at State 2) can be attained in a single or multiple steps. Note that there are no values defined for State 1 since micro radio stations are not active in State 0. However, it is still possible that the parameter values (excluding the on/off switch) in State 0 are the same as those at State 2 (Micro Operation) in which case no adjustment (in terms of values for power transmission and/or downtilt) will be required for switched off radio stations.

The Macro base-stations are active in both State 1 & 2 and therefore hold valid parameter values for these states but not for State 0 (since they do not switch off).

Using the same nomenclature, if there is only one step involved for the transition, and BS 1 is a Macro eNB and BS 2 is a Micro eNB, then the transition happens as follows with a single coordinated step:

BS1: P12→P11
BS2: P22→P20→Switch off

In theory, it is possible that P22=P20; in which case the transition for BS2 appears as P22→Switch off.

However, in most circumstances, the extra step P20 (which may or may not be same value as P22), is necessary and followed by the time-delay for handover before the switch off occurs.

Using P22→Switch off as the only step for BS2, does not allow a time-delay for handover, since BS2 needs to remain on for allowing the handovers.

This nomenclature is also suitable to characterise operation in more than 2 states. For example, in a scenario with three states of operation within the cluster such that BS1 is active in State 1, 2 & 3; BS 2 is active in States 2 & 3 and BS 3 is active only on State 3, then the following denotes the states and N/A applied to the eNBs:

BS 1: N/A at State 0; Transition from 3→2→1
BS 2: N/A at State 1; Transition from 3→2→0
BS 3: N/A at State 2 & 1; Transition from 3→0

The subsequent sections describe in detail one proposed solution to implement the transition from one state to another in an overlay network. As previously defined, this process may apply to a group of base stations (cells) forming all or part of the network, referred to as a cluster.

Mechanism for an ON→OFF Mode Transition to a Lower Capacity State (State 'n'→State 'n−1')

This transition happens as a result of the traffic/throughput demand falling below the set threshold so that a trigger is invoked to switch off some of the radio base stations within the cluster. It is essential that the traffic activity is monitored and aggregated for all radio stations within the cluster to ensure that total system traffic requirement can be met after the transition.

SON Server Flow

Figure 6:
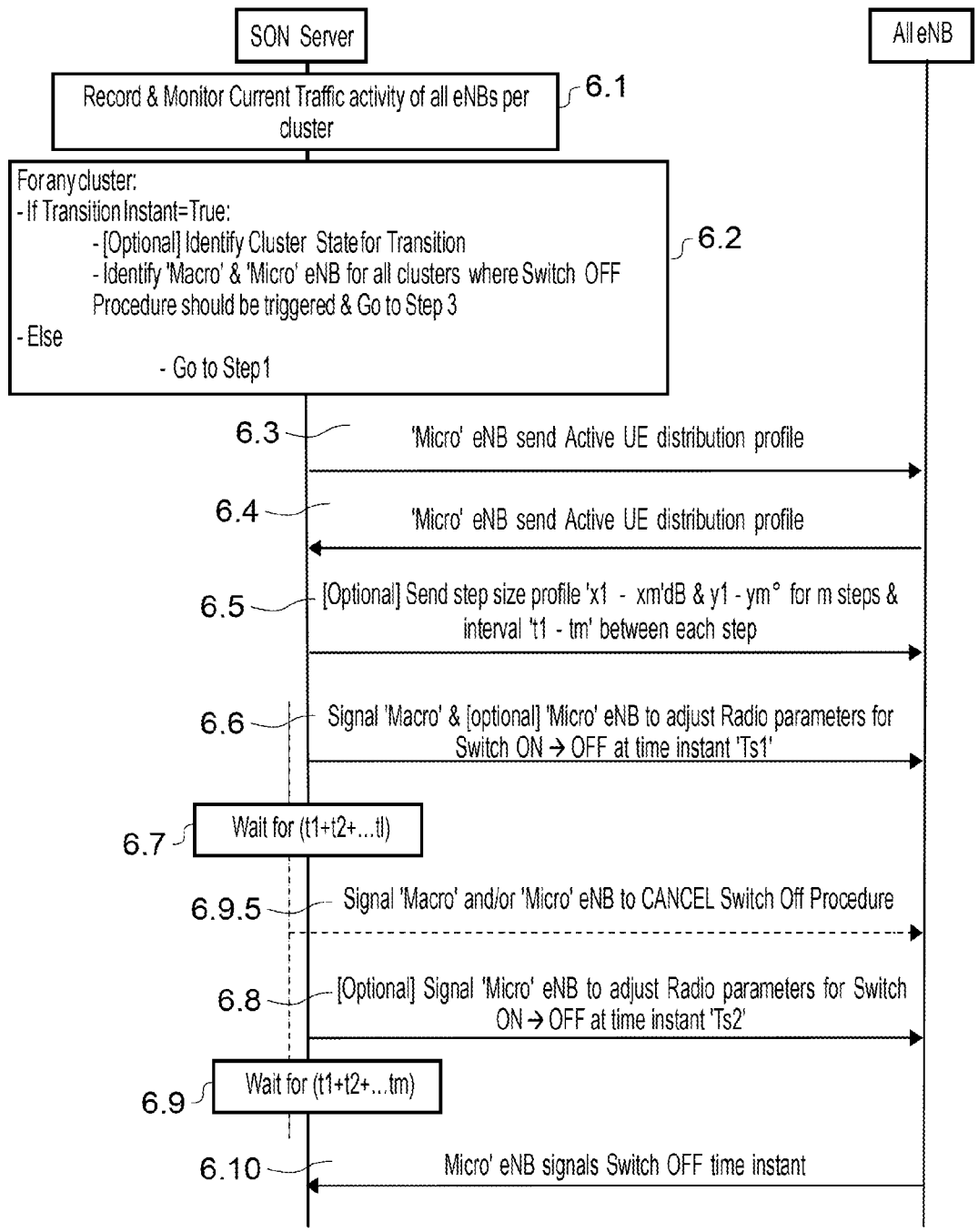
FIGS. 6 to 11 are detailed flow charts of the process of specific embodiments.

The "SON Server" monitors and records the traffic activity for one or more clusters, determines the transition instant and triggers the transition as per the flow shown in FIG. 6, which illustrates SON Server signalling flow during the Micro→Macro Mode Transition.

Step 6.1: The SON Server continuously monitors the current traffic activity from all radio base stations (eNB) for one or more clusters. The signalling messages to collect such load information may be implementation specific or compliant with a specification.

For example, a 3GPP Rel 9 based system can make use of "Load Reporting" feature of an eNB over X2 or S1 interface. The "Load Reporting" may be carried out for radio resources (PRB GBR UL/DL & PRB non-GBR UL/DL) or for the transport layer load (UL/DL TNL Load: low, mid, high, overload).

Step 6.2: The SON Server checks the condition if (Transition Instant=True). If false, the logic returns to Step 1. If true, the SON server identifies the 'macro' & 'micro' mode radio base station (eNB) within the cluster where the transition can be applied. Optionally, the SON server also identifies the Cluster State for transition.

Step 6.3: The SON server notifies the radio base stations (eNB) within the cluster to apply "Macro" or micro mode status. Optionally, the SON Server requests to report the UE distribution where the request is implied for base stations flagged 'micro'. Optionally, the SON server also signals the Cluster State for transition.

Step 6.4: [Optional] The SON Server receives the UE distribution profile from base stations flagged 'micro'.

Step 6.5: [Optional] The SON Server signals the Step size profile for 'm' steps: 'x1 . . . xm' dB (power) and 'y1 . . . ym' degree (tilt) and time-interval (delay) 't1 . . . tm' between steps to 'micro' and 'macro' base-stations.

Optionally, the SON Server may also send a fixed step size and step interval for all steps. Note that this if signalling is not used, then the values of step size and step interval can be set to pre-determined defaults, for example by the base stations. (The Steps 6 to 9 May be Implemented with the Following Two Variations Described in Option 1 & Option 2)

Option 1:

Step 6.6: The SON server notifies 'macro' eNB to perform parameter adjustment for micro→macro mode transition at time instant 'Ts1'. The time instant may be indicated in any form including 'Frame Number' in the case of OFDMA based systems.

Step 6.7: The SON Server waits for time (t1+t2 . . . t1) from time instant Ts1 where '1<m' is the number of time intervals for Macro transition.

Step 6.8: The SON server notifies 'micro' eNB to perform parameter adjustment for micro→macro mode transition at time instant 'Ts2'. The time instant may be indicated in any form including 'Frame Number' in case of OFDMA based system.

Step 6.9: SON Server waits for time [t1+t2 . . . tm] from time instant Ts1.

Option 2:

Step 6.6a: The SON server notifies 'macro' and 'micro' eNB to perform parameter adjustment for micro→macro mode transition at time instant 'Ts1'. The time instant may be indicated in any form including 'Frame Number' in case of OFDMA based system.

Step 6.7a: SON Server waits for time (t1+t2 . . . tm) from time instant Ts1.

Step 6.8a: Void.

Step 6.9a: Void.

(The Following Step Applies to Either Option Above)

Step 6.9.5: The SON Server may signal to 'macro' and/or 'micro' base stations to cancel the switch off procedure at any point after Step 6.3 and before Step 6.10. That is, if the transition condition of Step 2 reverses during the course of switch off procedure, then the SON Server uses this step so that the base-stations revert back to original state switch on state without going through the entire Switch OFF procedure thus reducing the time for transition (ON→OFF→ON) and thus leading to better QoE (Quality of Experience) for Active UEs.

Step 6.10: The SON server receives a signal from 'micro' base stations instructing the switch off time instant.

eNB Flow

Figure 7:
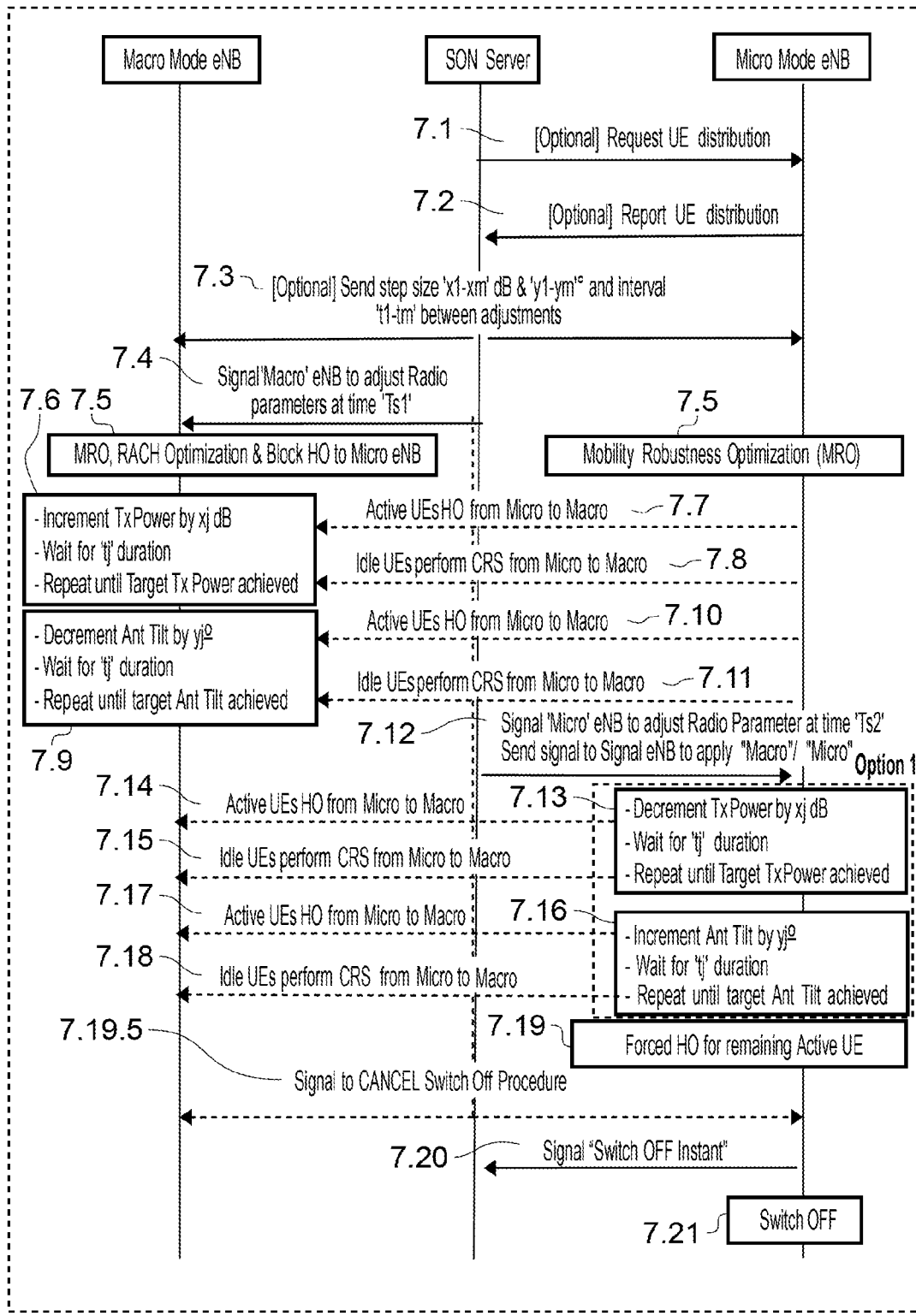
Figure 8:
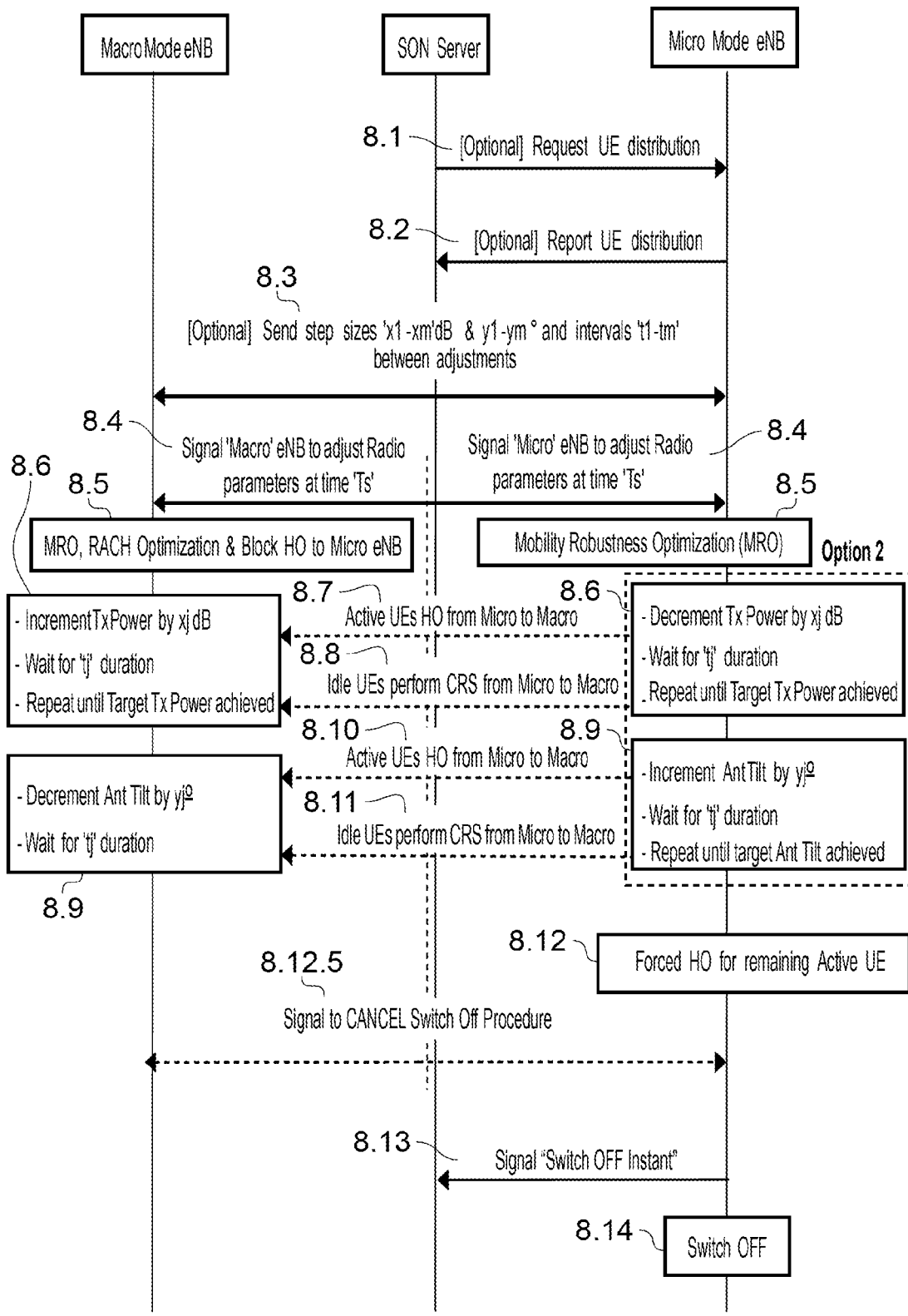

The corresponding flow of events at the radio base stations (referred to here as eNB) end during the micro→macro mode transition is shown in FIG. 7 for Option 1 and FIG. 8 for Option 2 along with corresponding steps.

FIG. 7 shows the radio base station (eNB) flow during micro→macro Mode Transition according to option 1

Option 1:

Step 7.1: [Optional] The 'micro' mode eNB receives request from SON Server to report UE distribution profile.

Step 7.2: [Optional] The 'micro' mode eNB sends the distribution profile for active UEs in response to a request from the SON server.

Step 7.3: [Optional] The 'micro' and 'macro' mode eNB receive the step size profile 'x1 . . . xm' dB and 'y1 . . . ym' degree for 'm' steps of parameter adjustment and also the step interval profile 't1 ... tm' to apply between each subsequent adjustment.

Step 7.4: The 'macro' mode eNB receives a signal from the SON Server to adjust radio parameters for micro→macro mode transition and to commence the adjustment at time instant 'Ts1'.

Step 7.5: The 'macro' and 'micro' mode eNB applies optimization to support the number of handovers which is expected to rise sharply as a result of transition. Such an optimization may be implementation specific or in compliance with a specification.

For instance, a 3GPP Rel 9 based eNB can optimize the handover parameter values, for example, certain threshold values for handover trigger events. Such optimization is referred to as Mobility Robustness Optimization. If applicable, it needs to be carried out for both Macro and Micro mode eNB.

Likewise, a 3GPP Rel 9 based eNB can perform RACH optimization by increasing the number of available RACH preamble sequences to minimise the probability of collision during handover. This is only necessary for the 'macro' Mode eNB.

Additionally, the 'macro' mode eNB performs setting modification so as to block any subsequent HO attempts by a UE from the 'macro' to any of the 'micro' eNB.

Step 7.6: If the target Tx Power values are different for macro and micro mode operation, the 'macro' mode eNB increments the Tx Power by 'xj' dB, waits for a time duration 'tj' and then repeats the process until the target Tx Power value is reached. The values of 'xj' & 'tj' are either signalled by the SON Server or a pre-defined fixed value and suffix 'j' represents the jth step.

Step 7.7: Automatic handover is performed by the affected active mode UEs from 'micro' eNB to 'macro' eNBs as a result of Step 7.6.

Step 7.8: Automatic cell-reselection is performed by the affected idle mode UEs from 'micro' eNB to 'macro' eNBs as a result of Step 7.6.

Step 7.9: The 'macro' mode eNB decrements the Antenna downtilt by 'yj' degree, waits for a time duration 'tj' and then repeats the process until the target downtilt value is reached. The values of 'yj' & 'tj' are either signalled by the SON Server or a pre-defined fixed value and suffix 'j' represents the jth step.

Step 7.10: Automatic handover is performed by the affected active mode UEs from 'micro' eNB to 'macro' eNBs as a result of Step 7.9.

Step 7.11: Automatic cell-reselection is performed by the affected idle mode UEs from 'micro' eNB to 'macro' eNBs as a result of Step 7.9.

Step 7.12: The 'micro' mode eNB receives a signal from the SON Server to adjust radio parameters for micro→macro mode transition and to commence the adjustment at time instant 'Ts2'.

Step 7.13: If the target Tx Power values are different for macro and micro mode operation, the 'micro' mode eNB decrements the Tx Power by 'xj' dB, waits for a time duration 'tj' and then repeats the process until the target Tx Power value is reached. The values of 'xj' & 'tj' are either signalled by the SON Server or a pre-defined fixed value and suffix 'j' represents the jth step.

Step 7.14: Automatic handover is performed by the affected active mode UEs from 'micro' eNB to 'macro' eNBs as a result of Step 7.13.

Step 7.15: Automatic cell-reselection is performed by the affected idle mode UEs from 'micro' eNB to 'macro' eNBs as a result of Step 7.13.

Step 7.16: The 'micro' mode eNB increments the antenna downtilt by 'yj' degree, waits for a time duration 'tj' and then repeats the process until the target downtilt value is reached. The values of 'yj' & 'tj' are either signalled by the SON Server or are pre-defined and suffix 'j' represents the jth step.

Step 7.17: Automatic handover is performed by the affected active mode UEs from 'micro' eNB to 'macro' eNBs as a result of Step 7.16.

Step 7.18: Automatic cell-reselection is performed by the affected idle mode UEs from 'micro' eNB to 'macro' eNBs as a result of Step 7.16.

Step 7.19: The 'micro' eNB forces handover of all the connected UEs to the 'macro' eNB. Since the delay is meant for handover procedure to complete for all required UEs, there is no need to set a delay before commencing the forced HO. Further, the forced handover is initiated and controlled by the radio stations (anchor & target) involved. Therefore, the Micro radio stations can take as much or as little time as required to allow handover for the remaining connected UEs. This is because for the final step, there is no more coverage impact and if different Micro base-stations switch off at different time instants within the cluster, it does not affect the operation as long as each Micro base-station hands over all its UEs to a Macro base-station before it switches off.

The only feature that is desirable is that the Micro base-station notifies the SON server of its Switch OFF time instant so that the server is aware whether the transition procedure has completed (which is when it receives the confirmation from all Micro stations from within the cluster). This allows the SON server to make a decision whether to issue a CANCEL command or invoke a reverse transition procedure for the next cycle.

Step 7.19.5: The 'macro' and/or 'micro' base-stations may receive the signal to CANCEL Switch OFF procedure at stage after Step 1 and before Step 21. In such case, the 'micro' and/or 'macro' base stations abandon any further steps of 'Switch OFF procedure'. Additionally, the 'macro' and 'micro' base stations begin 'Switch ON Procedure' as defined in Section 2.3.2 (Option 1) at the stage corresponding to that when the 'Cancel' signal was received.

Step 7.20: The 'micro' eNB signals the time instant of 'Switch OFF'.

Step 7.21: The 'micro' eNB 'Switches OFF' by deactivating its digital/radio processing and transmission circuitry.

FIG. 8 illustrates Radio Base station (eNB) signalling flow during micro→macro mode Transition according to option 2.

Option 2:

Step 8.1: [Optional] The 'micro' mode eNB receives a request from the SON Server to report UE distribution profile.

Step 8.2: [Optional] The 'micro' mode eNB sends the distribution profile for Active UEs in response to request from SON server.

Step 8.3: [Optional] The 'micro' and 'macro' mode eNB receive the step size profile 'x1 ... xm' dB and 'y1 ... ym' degree for parameter adjustment and also the step interval profile 't1 ... tm' to apply between each subsequent adjustment Step 8.4: The 'macro' and 'micro' mode eNBs receive signal from SON Server to adjust radio parameters for micro→macro mode transition at time Ts1.

Step 8.5: The 'macro' and 'micro' mode eNB applies optimization to support the number of handovers which is expected to rise sharply as a result of transition. Such an optimization may be implementation specific or in compliance with a specification as set out previously.

Additionally, the 'macro' mode eNB performs setting modification so as to block any subsequent HO attempts by a UE from the 'macro' to any of the 'micro' eNB.

Step 8.6: If the target Tx Power values are different for macro and micro mode operation, then simultaneous Tx power adjustment is carried out by 'macro' & 'micro' mode eNB whereby:
- the 'macro' mode eNB increments the Tx Power by 'xj' dB, waits for a time duration 'tj' and then repeats the process until the target Tx Power value is reached.
- the 'micro' mode eNB decrements the Tx Power by 'xj' dB, waits for a time duration 'tj' and then repeats the process until the target Tx Power value is reached.

The values of 'xj' & 'tj' are either signalled by the SON Server or a pre-defined fixed value and suffix 'j' represents the jth step.

Step 8.7: Automatic handover is performed by the affected active mode UEs from 'micro' eNB to 'macro' eNBs as a result of Step 8.6.

Step 8.8: Automatic cell-reselection is performed by the affected idle mode UEs from 'micro' eNB to 'macro' eNBs as a result of Step 8.6.

Step 8.9: The simultaneous antenna downtilt adjustment is carried out by 'macro' & 'micro' mode eNB whereby:
- the 'macro' mode eNB increments the antenna downtilt by 'yj' degree, waits for a time duration 'tj' and then repeats the process until the target Antenna downtilt value is reached.
- the 'micro' mode eNB decrements the antenna downtilt by 'yj' degree, waits for a time duration 'tj' and then repeats the process until the target antenna downtilt value is reached.

The values of 'yj' & 'tj' are either signalled by the SON Server or a pre-defined fixed value and suffix 'j' represents the jth step.

Step 8.10: Automatic handover is performed by the affected active mode UEs from 'micro' eNB to 'macro' eNBs as a result of Step 8.9.

Step 8.11: Automatic cell-reselection is performed by the affected idle mode UEs from 'micro' eNB to 'macro' eNBs as a result of Step 8.9.

Step 8.12: The 'micro' eNB forces handover of all the connected UEs to 'macro' eNB. Since the delay is meant for handover procedure to complete for all required UEs, there is no need to set a delay before commencing the forced HO. Further, the forced handover is initiated and controlled by the radio stations (anchor & target) involved. Therefore, the Micro radio stations can take as much or as little time as required to allow handover for the remaining connected UEs. This is because for the final step, there is no more coverage impact and if different Micro base-stations switch off at different time instants within the cluster, it does not affect the operation as long as each Micro base-station hands over all its UEs to a Macro base-station before it switches off.

The only feature that is desirable is that the Micro base-station notifies the SON server of its Switch OFF time instant so that the server is aware whether the transition procedure has completed (which is when it receives the confirmation from all Micro stations from within the cluster). This allows the SON server to make a decision whether to issue a CANCEL command or invoke a reverse transition procedure for the next cycle.

Step 8.12.5: The 'macro' and/or 'micro' base-stations may receive the signal to CANCEL Switch OFF procedure at stage after Step 1 and before Step 14. In such case, the 'micro' and/or 'macro' base stations abandon any further steps of 'Switch OFF procedure'. Additionally, the 'macro' and 'micro' base stations begin 'Switch ON Procedure' as defined in Section 2.3.2 (Option 2) at the stage corresponding to that when the 'Cancel' signal was received.

Step 8.13: The 'micro' eNB signals the time instant of 'Switch OFF'.

Step 8.14: The 'micro' eNB 'Switches OFF' by deactivating its digital/radio processing and transmission circuitry.

Mechanism for Macro→Micro Mode Transition (State 'n'→State 'n+1'):

This transition happens as a result of the traffic/throughput demand rising above the set threshold so that the trigger is invoked to switch on some or all of the radio base stations within the cluster. The traffic activity is monitored and aggregated for all base stations within the cluster to ensure that total system traffic requirement can be met after the transition.

SON Server Flow

Figure 9:
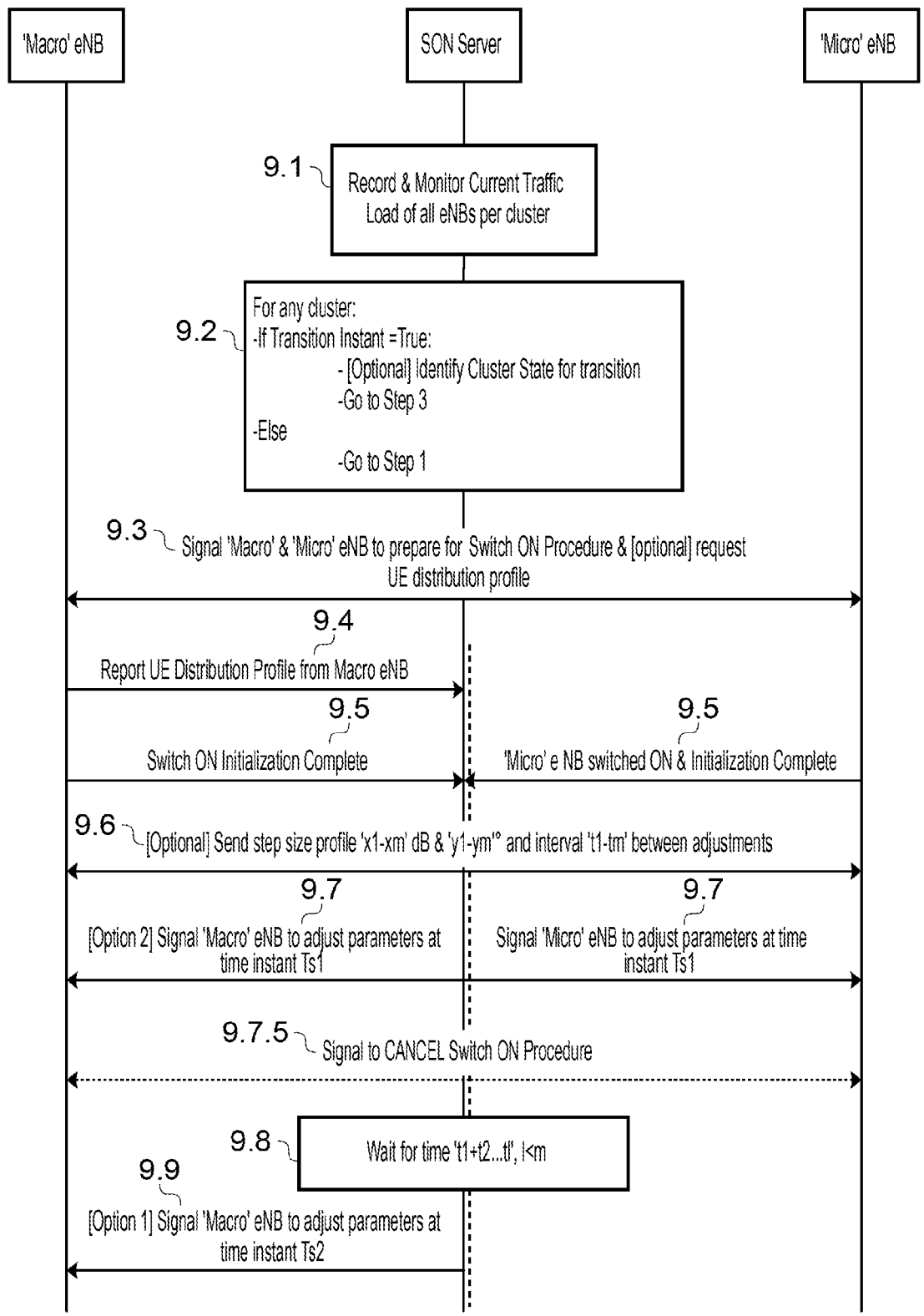

The "SON Server" monitors and records the traffic activity for one or more clusters, determines the transition instant and triggers the transition as per the flow shown in FIG. 9.

FIG. 9 illustrates SON Server Flow during Switch OFF→ON transition according to option 1 and option 2.

Step 9.1: The SON Server continuously monitors the current traffic activity from all radio base station (eNB) for one or more clusters. The signalling messages to collect such load information may be implementation specific or compliant with a specification.

For example, a 3GPP Rel 9 based system can make use of "Load Reporting" feature of an eNB over X2 or S1 interface. "Load Reporting" may be carried out for radio resources (PRB GBR UL/DL & PRB non-GBR UL/DL) or for transport layer load (UL/DL TNL Load: low, mid, high, overload).

Step 9.2: The SON Server checks the condition if (Transition Instant==True). If false, go to Step 1. If true, the SON server [Optionally] identifies the Cluster State for transition; then go to Step 3.

Step 9.3: The SON Server notifies the
- "switched off" (micro) radio base stations (eNB) within the cluster to prepare for the switch on procedure.
- macro eNB within the cluster to prepare for the switch on procedure (of the micro eNBs)

Optionally, the SON Server requests to report UE distribution where the request is implied for base stations flagged 'macro'. Optionally, the SON server also signals the Cluster State for transition to both the "Switched OFF" as well as "Macro" base stations.

Step 9.4: [Optional] The SON Server receives UE distribution profile from base stations flagged 'macro'.

Step 9.5. The SON server receives the "Switch ON Initialization Complete" message from all macro & micro mode eNBs. The switch on step triggers handover. There is no time-delay explicitly defined after this step but Ts (time of commencement) implicitly accounts for such delay and is defined based on the criteria as follows:

1. All eNBs have indicated to the SON Server that preparation for Switch ON is complete.
2. The time required to complete handover for UEs from Macro to Micro eNB. This will have to be predicted (unlike in the Switch OFF procedure where ALL UEs still connected to Micro eNB are to be handed over) based on the new coverage rings and the UE distribution profile (if available).

Step 9.6: [Optional] The SON Server signals the Step size profile for 'm' steps: 'x1-xm' dB and 'y1-ym' degree and time-interval 't1-tm' between steps to 'micro' and 'macro' base-stations.

Figure 10:
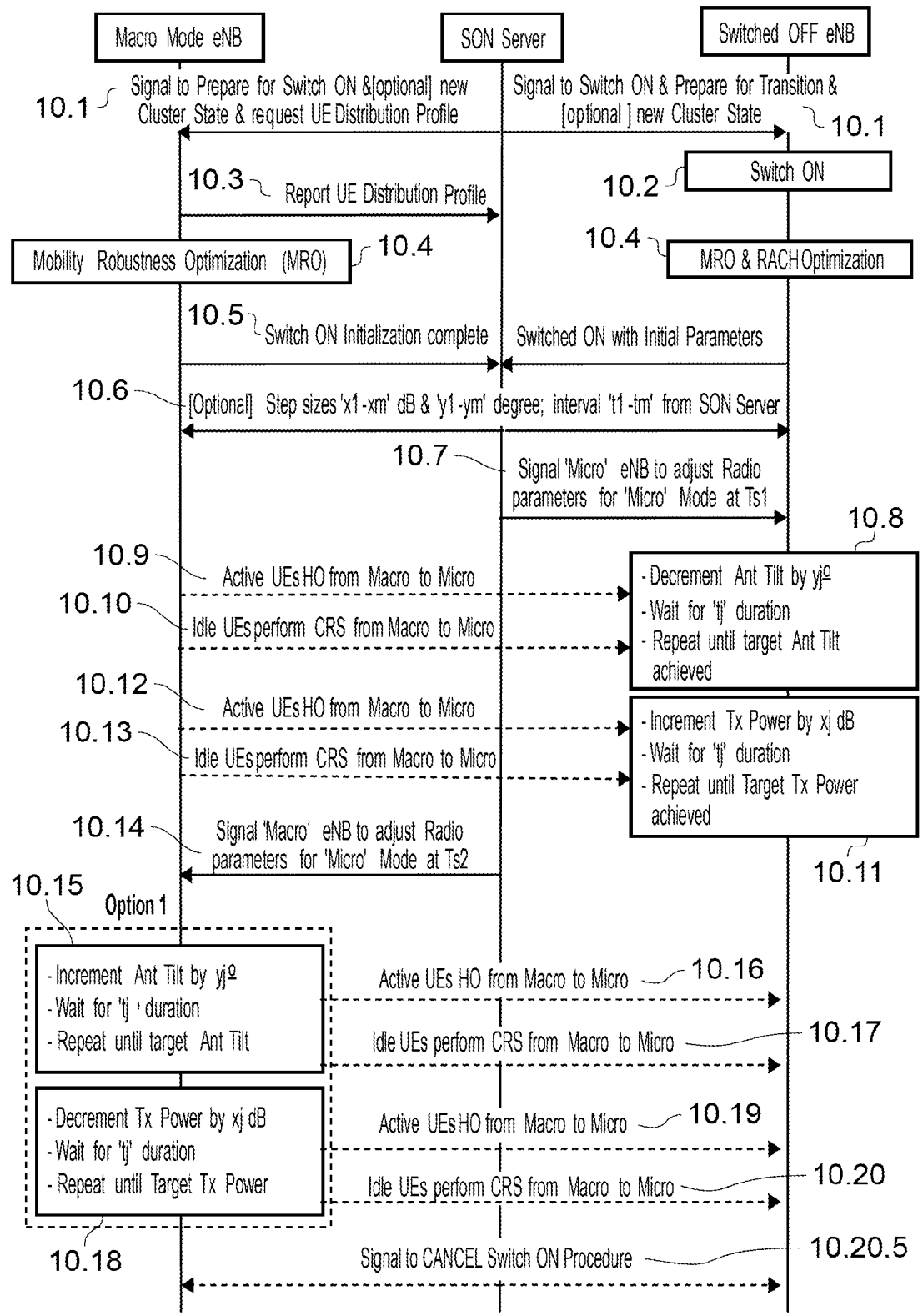

Optionally, the SON Server may also send a fixed step size and step interval for all steps. Note that if this signalling is not used, then the values of Step Size and Step Interval can be set to pre-determined defaults by the base stations.
(The Steps 9.7 to 9.9 May be Implemented with Following Two Variations Described in Option 1 & Option 2)
Option 1:
   Step 9.7: The SON server notifies the micro radio base stations (eNB) to perform parameter adjustment for macro→micro mode transition at time instant 'Ts1'. The time instant may be indicated in any form including 'Frame Number' in case of OFDMA based system.
   Step 9.8: The SON Server waits for time (t1+t2+ . . . t1) where 1<m & is the number of steps for parameter adjustment by micro eNBs.
   Step 9.9: The SON server notifies 'macro' eNB to perform parameter adjustment for macro→micro mode transition at time instant 'Ts2'. The time instant may be indicated in any form including 'Frame Number' in case of OFDMA based system.
   Step 9.7.5: The SON Server may signal to 'macro' and/or 'micro' base stations to cancel the switch on procedure at any point after Step 9.3 and before Step 9.10. That is, if the transition condition of Step 2 reverses during the course of Switch ON procedure, then the SON Server uses this step so that the base-stations revert back to original state Switch OFF State without going through entire Switch ON procedure thus reducing the time for transition (OFF→ON→OFF) and leading to better energy efficiency.
   Step 9.10: Switch ON procedure complete after time (t1+t2+ . . . tm) from time Instant Ts1.
Option 2:
   Step 9.7a: The SON server simultaneously notifies:
      'micro' eNB perform parameter adjustment for macro→micro mode transition.
      'macro' eNB to perform parameter adjustment for macro→micro mode transition.
   And to commence the parameter adjustment at time instant 'Ts'. The time instant may be indicated in any form including the 'Frame Number' in the case of OFDMA based system.
   Step 9.7.5a: The SON Server may signal to 'macro' and/or 'micro' base stations to cancel Switch ON procedure at any point after Step 3 and before Step 8. That is, if the transition condition of Step 2 reverses during the course of Switch ON procedure, then the SON Server uses this step so that the base-stations revert back to original state Switch OFF State without going through entire Switch ON procedure thus reducing the time for transition (OFF→ON→OFF) and leading to better energy efficiency.
   Step 9.8a: Switch ON procedure complete after time (t1+t2+ . . . tm) from time Instant Ts1.
   Step 9.9a: Void.
   Step 9.10a: Void.
eNB Flow
   The corresponding flow of events at the radio base stations' (eNB) end during the Micro→Macro Mode transition is shown in FIG. 10 for Option 1 and FIG. 11 for Option 2 along with corresponding steps.
   FIG. 10 shows the radio base station (eNB) flow during Macro→Micro Mode Transition according to option 1.
Option 1:
   Step 10.1: The 'micro' mode or Switched OFF eNB receives signal from SON Server to prepare for Switch ON procedure. The 'macro' mode eNB receives signal from SON Server to prepare for Switch ON procedure and [optional] request for UE distribution profile.
   Step 10.2: The 'micro' mode eNB switches on with radio parameters values that apply to State 0, triggering some UEs to handover to the micro eNB as previously discussed.
   Step 10.3: [Optional] The 'macro' mode eNB sends the distribution profile for Active UEs in response to request from SON server.
   Step 10.4: The 'macro' and 'micro' mode eNB applies optimization to support the number of handovers which is expected to rise sharply as a result of transition. Such an optimization may be implementation specific or in compliance with a specification as set out previously
   Step 10.5: The 'micro' and 'macro' mode eNB signal completion of preparation for Switch ON.
   Step 10.6: [Optional] The 'micro' and 'macro' mode eNB receive the step size profile 'x1 . . . xm' dB and 'y1 . . . ym' degree for parameter adjustment and also the step interval profile 't1 . . . tm' to apply between each subsequent adjustment.
   Step 10.7: [Optional] The 'micro' mode eNB receives signal from SON server to adjust radio parameters for Macro→Micro mode transition and also the time instant 'Ts1' to commence the parameter adjustment.
   Step 10.8: The 'micro' mode eNB decrements the Antenna downtilt by 'yj' degree, waits for a time duration 'tj' and then repeats the process until the target downtilt value is reached. The values of 'yj' & 'tj' are either signalled by the SON Server or a pre-defined fixed value and the suffix 'j' represents the step count (1 to n).
   Step 10.9: Automatic handover is performed by the affected active mode UEs from 'micro' eNB to 'macro' eNBs as a result of Step 10.8.
   Step 10.10: Automatic cell-reselection is performed by the affected idle mode UEs from 'micro' eNB to 'macro' eNBs as a result of Step 10.8.
   Step 10.11: The 'micro' mode eNB increments the Tx Power by 'xj' dB, waits for a time duration 'tj' and then repeats the process until the target Tx Power value is reached. The values of 'xj' & 'tj' are either signalled by the SON Server or have a pre-defined fixed value and the suffix 'j' represents the step count (1 to n).
   Step 10.12: Automatic handover is performed by the affected active mode UEs from 'macro' eNB to 'micro' eNBs as a result of Step 10.11.
   Step 10.13: Automatic cell-reselection is performed by the affected idle mode UEs from 'macro' eNB to 'micro' eNBs as a result of Step 10.11.
   Step 10.14: The 'macro' mode eNB receives signal from SON Server to adjust radio parameters for Macro→Micro mode transition and also the time instant 'Ts2' to commence the parameter adjustment.
   Step 10.15: The 'macro' mode eNB decrements the antenna downtilt by 'yj' degree, waits for a time duration 'tj' and then repeats the process until the target downtilt value is reached. The values of 'yj' & 'tj' are either signalled by the SON Server or a pre-defined fixed value and the suffix 'j' represents the step count (n+1 to m).
   Step 10.16: Automatic handover is performed by the affected active mode UEs from 'macro' eNB to 'micro' eNBs as a result of Step 10.15.
   Step 10.17: Automatic cell-reselection is performed by the affected idle mode UEs from 'macro' eNB to 'micro' eNBs as a result of Step 10.15.
   Step 10.18: If the target Tx Power values are different for Macro and Micro mode operation, the 'micro' mode eNB decrements the Tx Power by 'xj' dB, waits for a time duration 'tj' and then repeats the process until the target Tx Power value is reached. The values of 'xj' & 'tj' are either signalled by the SON Server or a pre-defined fixed value and the suffix 'j' represents the jth step.

Step 10.19: Automatic handover is performed by the affected active mode UEs from 'macro' eNB to 'micro' eNBs as a result of Step 10.18.

Step 10.20: Automatic cell-reselection is performed by the affected idle mode UEs from 'macro' eNB to 'micro' eNBs as a result of Step 10.18.

Step 10.20.5: The 'macro' and/or 'micro' base-stations may receive the signal to CANCEL Switch ON procedure at any stage after Step 1 and until Switch ON procedure is complete after time (t1+t2 ... tm) from Ts1. In such case, the 'micro' and/or 'macro' base stations abandon any further steps of 'Switch ON procedure'. Additionally, the 'macro' and 'micro' base stations begin 'Switch OFF Procedure' as defined in Section 2.2.2 (Option 1) at the stage corresponding to that when the 'Cancel' signal was received.

Figure 11:
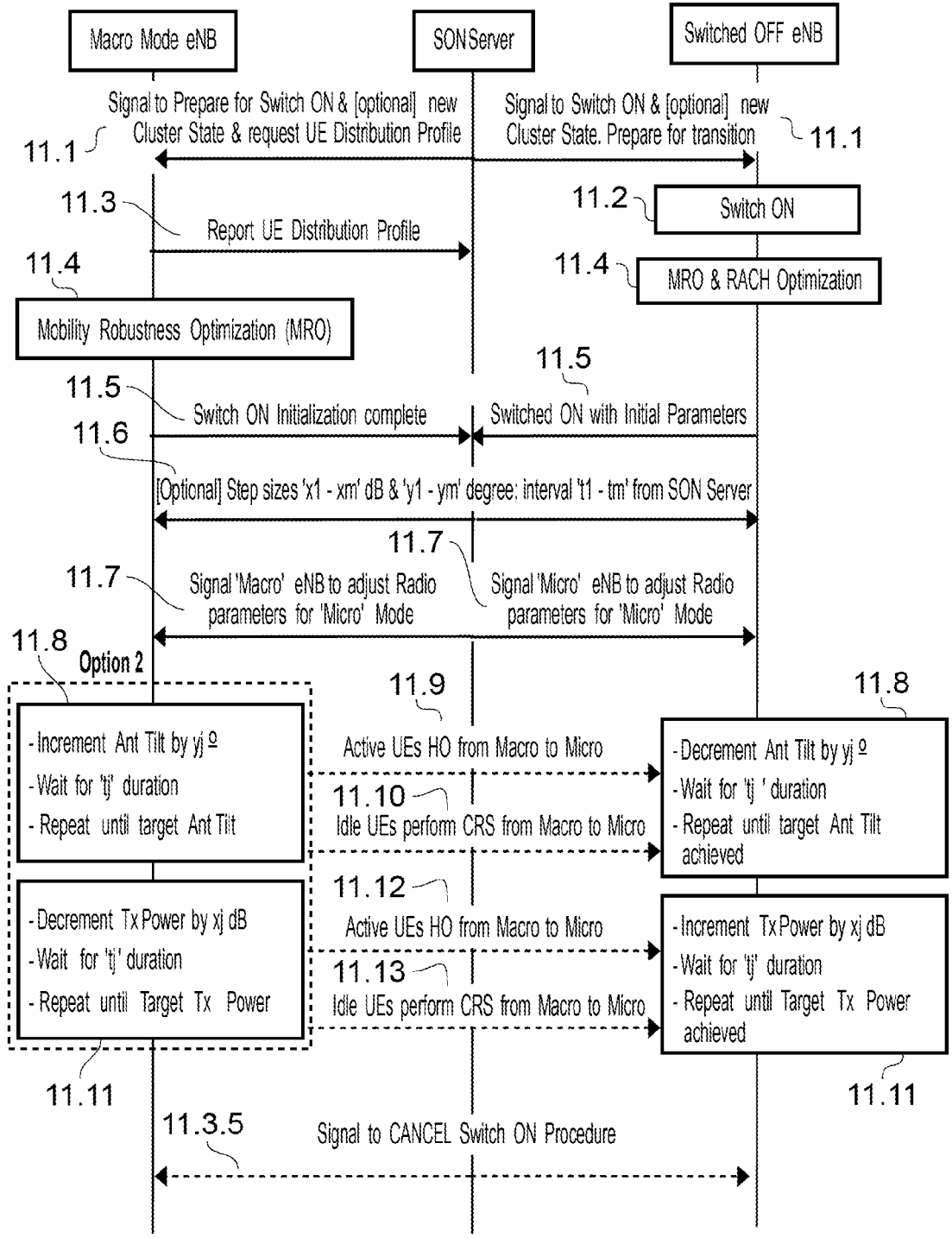

FIG. 11 shows radio base station (eNB) flow during Macro→Micro mode transition according to option 2.

Option 2:

Step 11.1: The 'micro' mode or Switched OFF eNB receives signal from SON Server to prepare for Switch ON procedure. The 'macro' mode eNB receives signal from SON Server to prepare for Switch ON procedure and [optional] request for UE distribution profile.

Step 11.2: The 'micro' mode eNB switches on with radio parameters values that apply to State 0.

Step 11.3: [Optional] The 'macro' mode eNB sends the distribution profile for Active UEs in response to request from SON Server.

Step 11.4: The 'macro' and 'micro' mode eNB applies optimization to support the number of handovers which is expected to rise sharply as a result of transition. Such an optimization may be implementation specific or in compliance with a specification as set out previously.

Step 11.5: The 'micro' and 'macro' mode eNB signals completion of preparation for Switch ON.

Step 11.6: [Optional] The 'micro' and 'macro' mode eNB receive the step size profile 'x1 ... xm' dB and 'y1 ... ym' degree for parameter adjustment and also the step interval profile 't1 ... tm' to apply between each subsequent adjustment.

Step 11.7: [Optional] The 'micro' and 'macro' mode eNBs receive signal from SON server to adjust radio parameters for Macro→Micro mode transition and also the time instant 'Ts1' to commence the parameter adjustment.

Step 11.8: The simultaneous Antenna downtilt adjustment is carried out by 'macro' & 'micro' mode eNB whereby:
the 'macro' mode eNB decrements the antenna downtilt by 'yj' degree, waits for a time duration 'tj' and then repeats the process until the target Antenna downtilt value is reached.
the 'micro' mode eNB increments the antenna downtilt by 'yj' degree, waits for a time duration 'tj' and then repeats the process until the target Antenna downtilt value is reached.

The values of 'yj' & 'tj' are either signalled by the SON Server or a pre-defined fixed value and the suffix 'j' represents the jth step.

Step 11.9: Automatic handover is performed by the affected active mode UEs from 'micro' eNB to 'macro' eNBs as a result of Step 11.8.

Step 11.10: Automatic cell-reselection is performed by the affected idle mode UEs from 'micro' eNB to 'macro' eNBs as a result of Step 11.8.

Step 11.11: If the target Tx Power values are different for macro and micro mode operation, then simultaneous Tx power adjustment is carried out by 'macro' & 'micro' mode eNB whereby:
the 'macro' mode eNB decrements the Tx Power by 'xj' dB, waits for a time duration 'tj' and then repeats the process until the target Tx Power value is reached.
the 'micro' mode eNB increments the Tx Power by 'xj' dB, waits for a time duration 'tj' and then repeats the process until the target Tx Power value is reached by 'macro' mode eNB.

The values of 'xj' & 'tj' are either signalled by the SON Server or a pre-defined fixed value and the suffix 'j' represents the jth step.

Step 11.12: Automatic handover is performed by the affected active mode UEs from 'macro' eNB to 'micro' eNBs as a result of Step 11.

Step 11.13: Automatic cell-reselection is performed by the affected idle mode UEs from 'macro' eNB to 'micro' eNBs as a result of Step 11.

Step 11.13.5: The 'macro' and/or 'micro' base-stations may receive the signal to CANCEL Switch ON procedure at any stage after Step 1 and until Switch ON procedure is complete after time (t1+t2 ... tm) from Ts1. In such case, the 'micro' and/or 'macro' base stations abandon any further steps of 'Switch ON procedure'. Additionally, the 'macro' and 'micro' base stations begin 'Switch OFF Procedure' as defined in Section 2.2.2 (Option 2) at the stage corresponding to that when the 'Cancel' signal was received.

SOME KEY ASPECTS OF INVENTION EMBODIMENTS

UE Distribution Profile

The term "UE distribution profile" refers only to active mode UEs, and thus might be more accurately termed "active UE distribution profile". The distribution profile refers to either the absolute or relative location or the distance from the serving cell of all active mode UEs within the cell. One way of representing this is in terms of signal strength (RSRQ/RSRP). The use of such a UE distribution profile is to determine the anticipated number of handover procedures for each step of the state transition.

Figure 12:
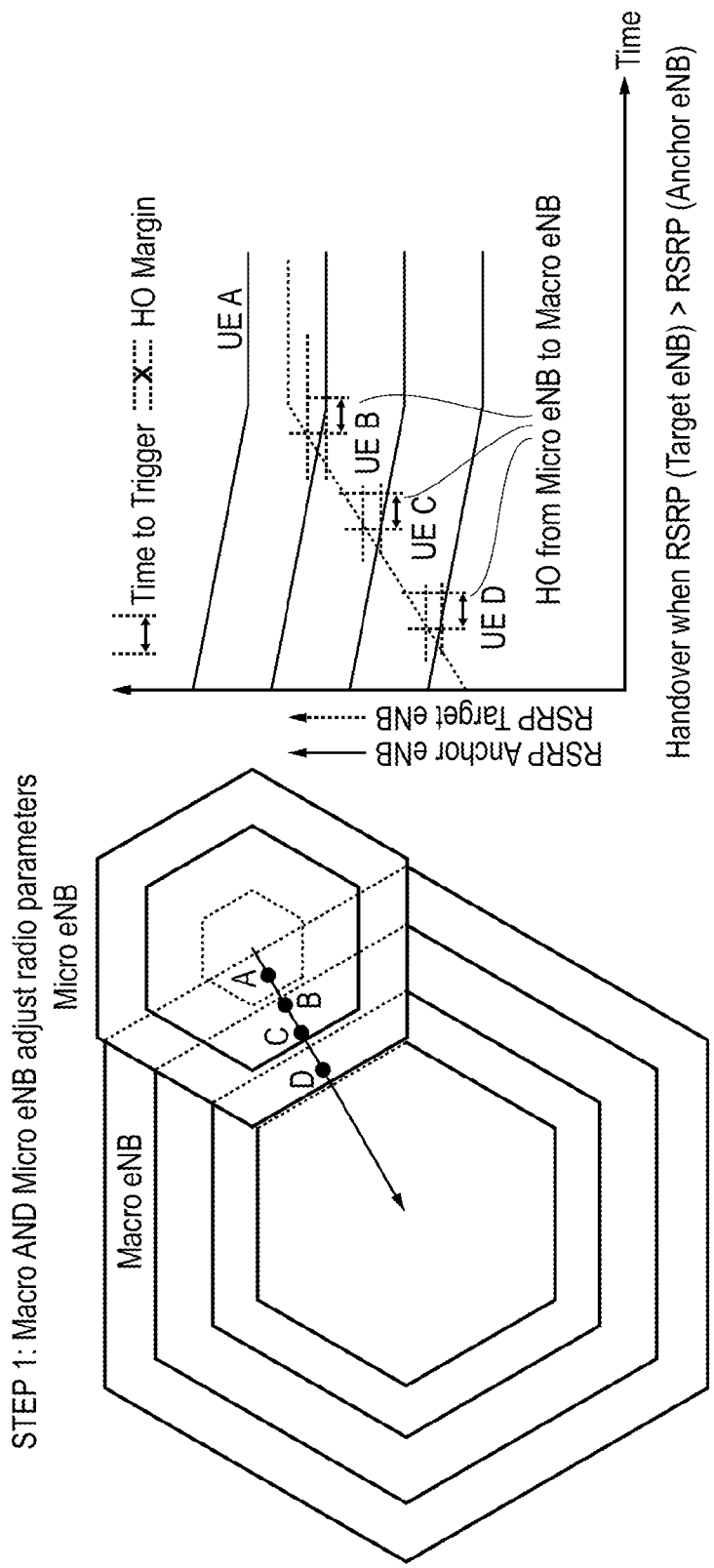
FIG. 12 is a geographic diagram and graph illustrating neighbouring radio station coverage during a state transition.

FIG. 12 illustrates two neighbouring eNBs in a transition from a higher capacity to a lower capacity state. The eNBs start with initially similar coverage areas, shown as the outer ring of the Micro eNB and the inner ring of the Macro eNB. Then, due to transition steps, the coverage area of Macro eNB increases while that of Micro eNB decreases, as shown by the concentric rings. In a first step, the coverage shifts so that the outermost concentric ring of Micro eNB coverage is removed while the first concentric ring of additional coverage of the macro eNB is added. UE 'D' is within this area of coverage shift and thus hands over from the Micro eNB to the macro eNB. In a second step UE 'C' and UE 'B' are within the coverage shift area. UE 'C' is further from the Micro eNB and therefore may hand over sooner than UE 'B'. Therefore, UEs 'D', 'C', and 'B' perform handover in that order based on their distance from the Micro eNB. Note that distance is only used as an example to demonstrate the order of handover sequence which may be also affected by other parameters like angle of UE from the radio station or the local shadowing effect, etc. Note that UE 'A' may still need to undergo a "Forced Handover" procedure for the Micro eNB to switch off. The Macro eNB is assumed to have coverage even prior to forced handover. The only reason that handover is not triggered automatically is that for UE 'A', the coverage is provided by both Macro and Micro eNB but the signal strength from Micro eNB is stranger than that of Macro eNB; hence the need for forced handover.

All the UEs, which are within the radius of the outermost concentric ring around the Micro eNB, can perform HO to a neighbouring macro eNB (target radio station) at the same time as UE 'D' during the first step, the handover being controlled by the anchor eNB. The step size needs to be controlled in order to limit the number of simultaneous handovers. In fact, the UEs may trigger handover at the same time even when they are NOT at the SAME radius from the eNB. The actual location (distance, angle, height) of UE with respect to eNB is only one of the many factors that impact the signal strength.

The signal strength (RSRP/RSRQ in LTE) is one parameter that is reported by UE to the eNB based on which handover decisions are taken by the eNBs. Generally, different criteria could be used by (Anchor) eNB to request handover to neighbour (Target) eNB. Such criteria are usually pre-configured for the network in the form of handover parameters.

The graph shown to the right of the geographic diagram in FIG. 12 is of signal strength from the anchor eNB (the Micro eNB in this case) and signal strength from the target eNB (the macro eNB in this case) plotted against time for each UE. The change in signal strength due to the transition in the two steps shown by the concentric rings in the geographic diagram is shown as a constant slope for ease of interpretation. The skilled reader will appreciate that a change between two different transmission powers in a transmission parameter adjustment step may involve a gradual increase or decrease rather than a step change. The same applies to change between two different antenna tilt values. Alternatively, a step change or interrupted slope (including timed delays) may be provided by transmission parameter adjustment.

In the given example, once the signal strength of the target eNB exceeds the signal strength of the anchor eNB by a given margin for any UE, the UE will hand over to the target eNB. Note that the criteria used for handover may use other conditions and such criteria are generally pre-configured for a network. Other examples of conditions for handover could be Signal strength from Target eNB exceeds an absolute threshold or Signal strength from Anchor eNB drops below an absolute threshold.

The idle mode UEs (which are not currently in use) do not have to be considered since they do not undergo a handover procedure but follow a different procedure called the "Cell Reselection Procedure" (CRS). The CRS procedure does not involve any UL or DL signalling and therefore poses no constraints on UL/DL Control plane resources; therefore this process need not be considered when determining step size.

Steps 'x' dB and 'y' Degrees

The purpose of defining the steps 'x' dB and 'y' degrees is that any change to the transmit parameter of an eNB will lead to consequent change in the radio coverage of the eNB as well as that of neighbouring eNB. Subsequently, this will create a situation where some of the 'Active' UEs within the coverage affected region will need to handover in order to maintain their radio link without dropping the call. Thus, an increased burst of handover activity is expected for any change in the transmit parameters of one or more eNBs. The required number of handovers may be so large for a given change that some of the UEs may experience dropped calls or even RLF (radio link failures) during the transition. The step sizes 'x' dB and 'y' degree provide control over the number of handovers for each step change.

The step sizes may be preset to a fixed value for a cluster or group of clusters. The minimum step size will be a function of the product specification. For example, if a given antenna supports remote downtilt adjustment of '+−10 degrees' with 2 degree resolution, then the step size 'y' can be no smaller than 2 degrees.

In some cases, setting the step size to a minimum resolution value may lead to increase in transition time for the Switch ON←→OFF procedure. This may be circumvented by defining larger step sizes whilst still maintaining the control on number of handovers for each increment or decrement in step. In order to estimate the expected number of handovers, the information about the 'active' mode UE distribution with respect to the serving eNB can be used. A simple method for determining this distribution is to use UE measurement, for example, CQI as the criteria to estimate the distance of each 'Active' mode UE from the Serving Cell at the time of transition. This information may be exploited by the SON Server to determine an optimum step size for the transition from ON→OFF or OFF→ON.

Time Interval 't' Between Step Adjustments

During the Switch ON→OFF or OFF→ON transition, the transmit parameters like downtilt and power are incremented and/or decremented by multiple eNBs within the cluster. As stated previously, this change in transmit parameters will affect the coverage property of the cluster. In order that radio coverage as well as QoE for Active mode UEs is maintained during the transition, each iteration (step change in power or tilt) is coordinated between eNBs of the cluster until the transition is complete. The coordination or (in some circumstances) synchronization can be achieved by using the parameter, time interval 't' which is a fixed time delay such as a offset in time between the start instant of any two subsequent step adjustments.

The value of 't' should be more than or equal to the total time required to complete the handover process for all the handovers that are expected or initiated as a result of the step change. For example, in case of 3GPP-LTE, the handover process may happen over S1 or X2 interface and for each UE, it would include the time from HO event for reporting measurement for HO, Time to Trigger, HO Command & Acknowledgement, Status/Resource transfer to Target eNB and finally until release of resources at Source eNB.

Time Instant 'Ts' for Commencing Parameter Adjustment

When a signal is sent by the SON Server to multiple eNBs to prepare and start parameter adjustment, the signal may be sent over an IP network (as in the case of X2 or S1 interface). Therefore, the message may be received by the eNBs at different time instants which again makes it necessary to employ a means of synchronization for the reasons stated in 2.4.2. Use of the parameter "Time instant for commencing parameter adjustment", 'Ts1' or 'Ts2' can ensure that the transition procedure starts simultaneously for all eNBs within the cluster in a synchronized manner.

Option of 'CANCEL' Command

If the trigger condition for ON→OFF transition or vice-versa is reversed during the course of transition, then it is beneficial to abort the transition process and revert back to original state. This can be achieved by means of defining the 'CANCEL' command that can be issued by the SON server to the eNBs if the trigger condition reverses for transition during the course of transition.

Choice of Option 1 & Option 2

The two options provided for the ON→OFF or OFF→ON transition differ primarily in the radio parameter adjustment stage. The radio parameter adjustment is synchronized in option 2 for the 'micro' and 'macro' mode eNBs. The benefit is a faster turnaround time for the transition and hence potential for further optimization in energy saving. However, the downside is more rapid handover for UEs migrating from Micro→Macro (or vice-versa) during the transition. If additional control is required in a system for handover, then Option 1 may be employed since the radio parameter adjustment occurs sequentially for 'micro' & 'macro' layers thereby decelerating the natural handover rate. The second option, providing a faster handover, is illustrated in FIG. 12, which has already been discussed. As can be seen from the graph, the micro eNB and macro eNB adjust their transmission parameters together.

The first option, providing a slower rate of handover, is shown in FIG. 13. This figure is similar to FIG. 12 and therefore the reader is referred to the earlier passages relating to FIG. 12 for a basic description. Here the macro eNB adjusts one or more radio parameter in a first stage and the micro eNB adjusts one or more radio parameters in a second, subsequent stage, once the first has been completed. The geographic diagram on the left illustrates the first stage and shows the macro eNB increasing its coverage. The corresponding graph shows the macro eNB signal strength increasing, causing handover of UE D and UE C in two steps. UE A and UE B are unaffected.

In a second stage, the micro eNB adjusts its radio parameters, giving a decrease in signal strength and causing handover of UE B. The reader will appreciate that the first step in this stage does not cause any handover because UE D, which is in the outer concentric rings of the micro eNB has already handed over to the macro eNB. In the second step, UE B and UE C hand over. A final step will allow the micro eNB to become inactive (switch off). Just before this step, UE A must handover to the macro eNB Some invention embodiments could alternatively provide adjustment of the micro and macro eNBs which is staggered but overlapping. Likewise step changes of a macro eNB could be alternated with step changes of a micro eNB. Again alternatively a power adjustment of a macro eNB could be followed by a power adjustment of a micro eNB and then tilt adjustment of a macro eNB followed by a tilt adjustment of a micro eNB. Such embodiments may increase the implementation complexity and therefore are probably less advantageous than options 1 and 2 set out above.

Option of Signalling Cluster State Information

In the scenario that the cluster changes state from x→y where |x−y|=m and m>1, then there is no way for the radio stations to know whether to adjust the parameters for target State 'x+1' or 'x+m'. The same problem exists for the Switch Off procedure.

Therefore, if the system supports the above scenario, then the option of the signalling message "Cluster State" from the SON Server to all the Macro & Micro radio stations circumvents the problem. That is, the "Cluster State" denotes the value of the state that the radio stations must prepare the transition for.

Key Innovative Concepts

The invention embodiments provide the following key innovations in the switch ON/OFF signalling mechanism:

A signalling procedure between the SON Server (or other coordinating entity) and radio stations for the transition between states.

The step sizes 'x' dB and 'y' degrees for transmit power and antenna downtilt incremental adjustment and the time interval between increments. These may be adapted for each step (i.e. providing an adaptive step size) based on the expected or estimated number of handovers for each step change. This can enable a faster ON←→OFF transition times leading to a better energy efficiency whilst carefully controlling the number of simultaneous handovers.

The capability of the SON Server to reverse the ON→OFF or OFF→ON procedure if the trigger for transition reverses during the course of the transition by issuing a "CANCEL" command. This can increase the stability of the system giving potentially better energy efficiency and system performance.

BENEFITS OF INVENTION EMBODIMENTS

Reliable Quality of Service for the UE since the embodiments aim to provide a reliable link for UEs and sufficient coverage during the transition.

Stable system performance since the embodiments minimize probability of RACH failures or collisions for the migrating UEs during transition.

Scalable solution since the transition mechanism of invention embodiments can be applied to a cluster of any size.

Increased energy saving without loss of performance efficiency due to scalable steps and interval between the steps for power and/or downtilt adjustments during the transitions to enable faster transition time and more controlled handover.

Implementation flexibility since embodiment allow for both a distributed or centralized approach for the realization of the solution.

The various features of invention embodiments may be implemented in hardware, or as software modules running on one or more processors or in any other suitable technology. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a (non-transitory) computer-readable medium, or it could, for example, be in the form of a signal such as a downloadable data signal provided from an Internet website, or it could be in any other form.

The invention claimed is:

1. A method in a cluster of cells in a communications network comprising switching between a first state, in which a first number of radio stations is active and a second state in which a second, different number of radio stations is active, wherein the second state is intended to provide the same geographic coverage as the first state but a different capacity, and in which the transition between states is carried out using transmission parameter adjustment, wherein the transmission parameter adjustment takes place in a plurality of radio stations and is co-ordinated in time for these radio stations, wherein the transmission parameter adjustment takes place in one or more steps, and the method includes initially determining a number of steps in the transition according to a number of user equipment handovers expected to be produced by the transition, and wherein the method includes initially determining a size of steps in the transition according to the number of user equipment handovers expected to be produced by the transition.

2. A method according to claim 1, wherein at least one step of transmission parameter adjustment is followed by a timed delay to allow for user equipment handover, which timed delay is preferably more than or equal to the total time required to complete the handover process for all the user equipment handovers that are expected as a result of the step change.

3. A method according to claim 1, wherein the transmission parameters which may be adjusted include transmission power and/or antenna downtilt, and preferably wherein transmission power and antenna downtilt are adjusted in separate steps of transmission parameter adjustment.

4. A method according to claim 1, further comprising subsequently switching between the second state and a third state, in which third state a further different number of radio stations is active, wherein the third state is intended to provide the same geographic coverage as the first and second states but a further different capacity and wherein transition between the second and the third states is carried out using transmission parameter adjustment, wherein the transmission parameter adjustment takes place in a plurality of radio stations and is co-ordinated in time for all these radio stations.

5. The method according to claim 1, wherein for transition between a higher capacity state and a lower capacity state or vice versa, macro radio stations, which are active in both states, and micro radio stations, which are active only in the higher capacity state, adjust their transmission parameters and preferably wherein all the macro radio stations adjust their transmission parameters together, and all the micro radio stations adjust their transmission parameters together.

6. A method according to claim 5, wherein the transmission parameter adjustment for a transition between two states is carried out in two sequential stages, a first stage for all transmission parameter adjustment for the or each micro radio station or macro radio station and a second stage for all transmission parameter adjustment for the or each macro radio station or micro radio station respectively, and preferably wherein, in a switch to a higher demand state, the or each micro radio station is adjusted in the first stage and in a switch to a lower demand state, the or each macro radio station is adjusted in the first stage.

7. A method according to claim 5, wherein the macro and micro radio stations adjust their transmission parameters together in at least one transmission parameter adjustment step.

8. A method according to claim 1, wherein a coordinating entity coordinates the actions of the radio stations within the cluster during the transition, preferably by signalling the radio stations to adjust their transmission parameters.

9. A method according to claim 8, wherein the coordinating entity requests an active mode user equipment distribution profile from the radio stations and preferably instructs the radio stations as to a transmission parameter step change size and interval before signalling the radio stations to adjust their transmission parameters.

10. A method according to claim 1, wherein the method may be cancelled at any point by reversing the transition process.

11. A communications network including radio stations, a cluster of radio stations in the communications network being operable to switch between a first state, in which a first number of radio stations is active and a second state in which a second, different number of radio stations is active, in which the second state is intended to provide the same geographic coverage as the first state but a different capacity, wherein
the radio stations are controlled to carry out the transition between states using transmission parameter adjustment, wherein the transmission parameter adjustment takes place in a plurality of radio stations and is co-ordinated in time for these radio stations,
wherein the control allows transmission parameter adjustment to take place in one or more steps, the control including initially determining a number of steps in the transition according to a number of user equipment handovers expected to be produced by the transition, and
wherein the control includes initially determining a size of steps according to the number of user equipment handovers expected to be produced by the transition.

12. A radio station in a cluster of radio stations in a communications network, the cluster being operable to switch between a first state, in which a first number of radio stations is active and a second state in which a second, different number of radio stations is active, in which the second state is intended to provide the same geographic coverage as the first state but a different capacity, wherein
the radio station includes control functionality to carry out the transition between states using transmission parameter adjustment, with timing specified so that the transmission parameter adjustment takes place in co-ordination with other radio stations in the cluster, and
wherein the control allows transmission parameter adjustment to take place in one or more steps, the control including initially determining a size of the one or more steps and a number of steps in the transition according to a number of user equipment handovers expected to be produced by the transition.

13. A radio station according to claim 12, including a coordinating entity which coordinates the actions of all the radio stations within the cluster during the transition, preferably by signalling the radio stations to adjust their transmission parameters in response to a trigger.

14. A coordinating entity operable to control a transition in a cluster of radio stations of a communications network, by coordinating a switch between a first state, in which a first number of radio stations is active and a second state in which a second, different number of radio stations is active, in which the second state is intended to provide the same geographic coverage as the first state but a different capacity; wherein
the coordinating entity includes functionality to instruct the radio stations to carry out the transition between states using transmission parameter adjustment, wherein the instructed transmission parameter adjustment takes place in a plurality of radio stations and is co-ordinated in time for these radio stations;
the coordinating entity initially determining a number of one or more steps of transmission parameter adjustment and a size of the one or more steps in transition according to a number of user equipment handovers expected to be produced by the transition and then instructing the transmission parameter adjustment to take place in the number and size of steps.

* * * * *